(12) United States Patent
Yamanaka

(10) Patent No.: US 11,032,008 B2
(45) Date of Patent: Jun. 8, 2021

(54) OPTICAL TRANSMITTER AND METHOD OF CONTROLLING OPTICAL TRANSMITTER

(71) Applicant: SUMITOMO ELECTRIC INDUSTRIES, LTD., Osaka (JP)

(72) Inventor: Shingo Yamanaka, Osaka (JP)

(73) Assignee: SUMITOMO ELECTRIC INDUSTRIES, LTD., Osaka (JP)

(*) Notice: Subject to any disclaimer, the term of this patent is extended or adjusted under 35 U.S.C. 154(b) by 0 days.

(21) Appl. No.: 16/796,811

(22) Filed: Feb. 20, 2020

(65) Prior Publication Data
US 2020/0274621 A1 Aug. 27, 2020

(30) Foreign Application Priority Data

Feb. 25, 2019 (JP) .............................. JP2019-031917

(51) Int. Cl.
*H04B 10/50* (2013.01)
*G02F 1/225* (2006.01)
*H04B 10/556* (2013.01)

(52) U.S. Cl.
CPC ..... *H04B 10/50572* (2013.01); *G02F 1/2255* (2013.01); *H04B 10/50577* (2013.01);
(Continued)

(58) Field of Classification Search
CPC .......... H04B 10/50572; H04B 10/5561; H04B 10/50577; H04B 10/50575;
(Continued)

(56) References Cited

U.S. PATENT DOCUMENTS 9,184,834 B1* 11/2015 Zhang ................ H04B 10/5561
10,177,852 B2* 1/2019 Chen .................... H04B 10/541
(Continued)

FOREIGN PATENT DOCUMENTS

JP 2007-208472 8/2007
JP 2016-218424 12/2016

OTHER PUBLICATIONS

Cho, Pak S., Closed-Loop Bias Control of Optical Quadrature Modulator, *IEEE Photonics Technology Letters*, vol. 18, No. 21, Nov. 2006.

*Primary Examiner* — Dibson J Sanchez
(74) *Attorney, Agent, or Firm* — Smith, Gambrell & Russell, LLP.

(57) ABSTRACT

An optical transmitter includes a bias supplying unit configured to supply a first bias voltage, a second bias voltage and a third bias voltage to an optical modulator. The bias supplying unit acquires a first voltage value at which an average value of an optical output signal becomes maximum by sweeping the first bias voltage, acquires a second voltage value at which an average value of the optical output signal becomes maximum by sweeping the second bias voltage, and acquires a third voltage value at which an average value of the optical output signal becomes maximum by sweeping the third bias voltage. The bias supplying unit determines a value of the first bias voltage based on the first voltage value, determines a value of the second bias voltage based on the second voltage value, and determines a value of the third bias voltage based on the third voltage value.

12 Claims, 10 Drawing Sheets

(52) U.S. Cl.
CPC ......... *H04B 10/5561* (2013.01); *H04B 10/50* (2013.01); *H04B 10/5057* (2013.01)

(58) Field of Classification Search
CPC ............ H04B 10/5053; H04B 10/5057; H04B 10/50; G02F 1/2255
USPC ................................................ 398/182–201
See application file for complete search history.

(56) References Cited

U.S. PATENT DOCUMENTS

| | | |
|---|---|---|
| 2007/0177882 A1 | 8/2007 | Akiyama |
| 2009/0047028 A1* | 2/2009 | Terahara .......... H04B 10/50577 398/188 |
| 2010/0098435 A1 | 4/2010 | Akiyama |
| 2011/0170877 A1 | 7/2011 | Akiyama |
| 2014/0153077 A1* | 6/2014 | Kawakami ............ H04L 27/364 359/259 |
| 2014/0168741 A1* | 6/2014 | Li .................... H04B 10/50575 359/239 |
| 2015/0050030 A1* | 2/2015 | Le Taillandier De Gabory .......... H04B 10/564 398/183 |
| 2015/0188639 A1* | 7/2015 | Akashi ............. H04B 10/50575 398/197 |
| 2017/0359122 A1* | 12/2017 | Chen ................. H04B 10/2575 |
| 2018/0323878 A1* | 11/2018 | Kawakami .............. G02F 1/225 |
| 2019/0036611 A1* | 1/2019 | Fujita ................... H04B 10/516 |
| 2019/0273558 A1* | 9/2019 | Huang ................. G02F 1/0123 |
| 2020/0133035 A1* | 4/2020 | Kawakami ............ G02F 1/0327 |

\* cited by examiner

OPTICAL TRANSMITTER AND METHOD OF CONTROLLING OPTICAL TRANSMITTER

TECHNICAL FIELD

The present disclosure relates to an optical transmitter and a method of controlling the optical transmitter. This application claims priority to Japanese Patent Application No. 2019-031917, filed Feb. 25, 2019, the entire disclosure of which is incorporated herein by reference.

BACKGROUND

Optical transmitters having optical modulators in which Mach-Zehnder type modulators are nested are known. Such an optical transmitter generates a modulated optical signal by applying a driving signal and a bias voltage to an optical waveguide of each Mach-Zehnder modulator. In order to bias each Mach-Zehnder modulator at an appropriate voltage, the state of the output light of the optical modulator is monitored and feedback to the bias voltage is performed. Japanese Patent Application Laid-Open No. 2007-208472 discloses an optical transmitter for applying a bias voltage to each of the Mach-Zehnder type modulators and a phase shifter for providing a phase difference between optical signals modulated by each of the Mach-Zehnder type modulators. In this optical transmitter, each bias voltage is adjusted so that the power of the monitor signal of the optical signal output from the optical modulator becomes maximum or minimum.

The present disclosure provides an optical transmitter and a method of controlling the optical transmitter, wherein the bias voltage for the optical modulator can be appropriately adjusted.

SUMMARY

An optical transmitter according to one aspect of the present disclosure includes an optical modulator including a first inner modulator, a second inner modulator, and an outer modulator, the first inner modulator generating a first modulated optical signal by phase-modulating a first split light in response to a first driving signal, the second inner modulator generating a second modulated optical signal by phase-modulating a second split light in response to a second driving signal, the outer modulator generating an optical output signal from the first modulated optical signal and the second modulated optical signal, and the first and second split light being split from an input light, a bias supplying unit configured to supply a first bias voltage to the first inner modulator, a second bias voltage to the second inner modulator, and a third bias voltage to the outer modulator, the first bias voltage being a reference voltage for a first driving signal, and the second bias voltage being a reference voltage for a second driving signal, and a detection unit configured to detect a power of the optical output signal. Each of the first and second driving signals has respective maximum amplitude equal to or smaller than a half-wavelength voltage, the half wavelength voltage being a voltage for changing a phase of light by 180°. The bias supplying unit acquires a first voltage value at which an average value of the optical output signal becomes maximum, the first voltage value is acquired by sweeping the first bias voltage under a driving condition at which the first driving signal being supplied to the first inner modulator and the second driving signal being supplied to the second inner modulator. The bias supplying unit acquires a second voltage value at which an average value of the optical output signal becomes maximum by sweeping the second bias voltage under the driving condition. The bias supplying unit acquires a third voltage value at which an average value of the optical output signal becomes maximum by sweeping the third bias voltage under the driving condition. The bias supplying unit determines an optimum value of the first bias voltage based on the first voltage value. The bias supplying unit determines an optimum value of the second bias voltage based on the second voltage value. The bias supplying unit determines an optimum value of the third bias voltage based on the third voltage value.

DETAILED DESCRIPTION

Figure 1:
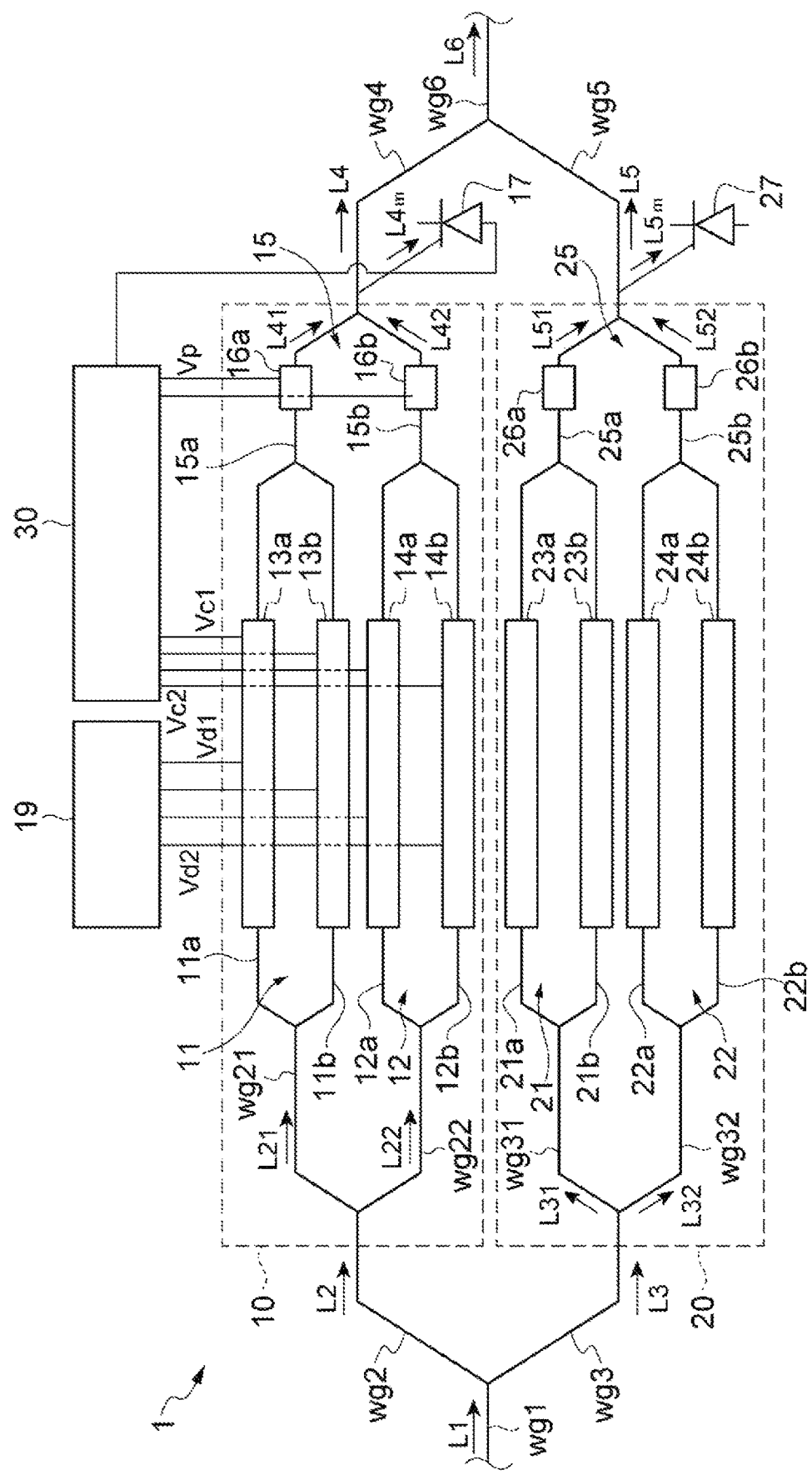
FIG. 1 is a schematic configuration diagram of an optical transmitter according to an embodiment.

Specific examples of the optical transmitter and the method of controlling the optical transmitter according to the embodiment of the present disclosure will be described below with reference to the drawings. In the description of the drawings, the same or corresponding portions are denoted by the same reference numerals, and a repetitive description thereof is omitted. It should be noted that the present disclosure is not limited to these examples, but is indicated by the claims, and it is intended to include all modifications within the meaning and range equivalent to the claims.

FIG. 1 is a schematic configuration diagram of an optical transmitter according to an embodiment. The optical transmitter 1 outputs a polarization multiplexed optical signal L6 obtained by modulating a continuous-wave (CW) light L1. For instance, the CW light (input light) L1 is input from an external light source such as a laser diode. Specifically, the optical transmitter 1 generates the polarization multiplexed optical signal L6 by modulating the CW light (input light) L1 by a DP-QPSK (Dual Polarization-Quadrature Phase Shift Keying) modulation method, and outputs the polarization multiplexed optical signal L6 to the outside. The optical transmitter 1 includes a plurality of optical modulators 10 and 20, detection units 17 and 27, a driving unit 19, and a bias supplying unit 30. The optical modulators 10 and 20 are formed on a substrate having an electro-optical effect. For example, the optical modulators 10 and 20 are formed on substrates such as a lithium niobate (LiNbO$_3$) substrate, an indium phosphorus compound semiconductor substrate, or a silicon substrate. The detection units 17 and 27 may be formed on the same substrate as the optical modulators 10 and 20, respectively, and may be incorporated in the optical modulators 10 and 20, respectively.

In the optical transmitter 1, the CW light L1 having predetermined frequencies is input to the optical waveguide wg1. The CW light L1 is split into optical waveguides wg2, wg3 as two lights L2, L3 for being polarization multiplexed as X-polarized light and Y-polarized light. For example, the light L2 for X-polarized light is input to the optical modulator 10 for an optical signal through the optical waveguide wg2. The light L3 for Y-polarized light is input to the optical modulator 20 for an optical signal through the optical waveguide wg3. The respective polarization planes of the X-polarized light and the Y-polarized light are different from each other by 90°. For example, the power (intensity) of the X-polarized light is approximately equal to the power of the Y-polarized light.

The optical modulator 10 performs QPSK modulation on the light L2 to generate an optical output signal L4. The optical modulator 10 outputs the optical output signal L4 to an optical combining unit wg6 via the optical waveguide wg4. The optical modulator 20 performs QPSK modulation on the light L3 to generate an optical output signal L5. The optical modulator 20 outputs the optical output signal L5 to the optical combining unit wg6 via the optical waveguide wg5. Even if the light L2 and the light L3 pass through the optical modulator 10 and the optical modulator 20, the relationship between the respective polarization planes is maintained. The polarization plane of the optical output signal L4 is rotated around the direction of travel after it is output from the optical modulator 10, so that the polarization planes of the optical output signals L4 and L5 become orthogonal to each other. The optical output signal L4 and the optical output signal L5 are combined in the optical combining unit wg6 and output to the outside from the optical transmitter 1 as a polarization multiplexed optical signal L6.

The optical modulator 10 includes inner modulators 11, 12, and an outer modulator 15. The light L2 is split to the optical waveguides wg21, wg22 as two split lights L21 and L22. The split light L22 is a residual of the light L21 from the light L2.

The inner modulator (first inner modulator) 11 is a Mach-Zehnder modulator having a pair of optical waveguides 11a and 11b. The inner modulator 11 phase-modulates the split light L21 (first split light) to generate a modulated optical signal L41 (first modulated optical signal). The inner modulator 11 outputs the modulated optical signal L41 to an optical waveguide 15a. The inner modulator (second inner modulator) 12 is a Mach-Zehnder modulator having a pair of optical waveguides 12a and 12b. The inner modulator 12 phase-modulates the split light L22 (second split light) to generate a modulated optical signal L42 (second modulated optical signal). The inner modulator 12 outputs the modulated optical signal L42 to an optical waveguide 15b. The inner modulators 11 and 12 are also referred to as child modulators. Each of the inner modulators 11 and 12 performs, for example, BPSK (Binary Phase Shift Keying) modulation. The inner modulators 11 and 12 may have substantially the same optical and electrical characteristics with respect to the phase modulation of the optical signal.

The outer modulator 15 (third modulator) is a phase shifter having a pair of optical waveguides 15a and 15b. The outer modulator 15 generates an optical output signal L4 from the modulated optical signal L41 and the modulated optical signal L42. The outer modulator 15 outputs the optical output signal L4 to the optical waveguide wg4. The outer modulator 15 is also referred to as a parent modulator. The outer modulator 15 changes a phase difference between the phases of the modulated optical signal L41 and the modulated optical signal L42 in accordance with the applied bias voltage.

The optical modulator 20 includes inner modulators 21, 22, and an outer modulator 25. The light L3 is split to the optical waveguide wg31, wg32 as two split lights L31 and L32. The split light L32 is a residual after the split light L31 being subtracted from the light L3.

The inner modulator 21 is a Mach-Zehnder modulator having a pair of optical waveguides 21a and 21b. The inner modulator 21 phase-modulates the split light L31 to generate a modulated optical signal L51. The inner modulator 21 outputs the modulated optical signal L51 to an optical waveguide 25a. The inner modulator 22 is a Mach-Zehnder modulator having a pair of optical waveguides 22a and 22b. The inner modulator 22 phase-modulates the split light L32 to generate a modulated optical signal L52. The inner modulator 22 outputs the modulated optical signal L52 to an optical waveguide 25b. The inner modulators 21 and 22 are also referred to as child modulators. Each of the inner modulators 21 and 22 performs, for example, BPSK modulation. The inner modulators 21 and 22 may have substantially the same optical and electrical characteristics with respect to the phase modulation of the optical signal.

The outer modulator 25 is a phase shifter having a pair of optical waveguides 25a and 25b. The outer modulator 25 generates an optical output signal L5 from the modulated optical signal L51 and the modulated optical signal L52. The outer modulator 25 outputs the optical output signal L5 to an optical waveguide wg5. The outer modulator 25 is also referred to as a parent modulator. The outer modulator 25 changes a phase difference between the phase of the modulated optical signal L51 and the phase of the modulated optical signal L52 in accordance with the applied bias voltage.

The detection unit 17 allows the bias supplying unit 30 to detect a power (intensity) of the optical output signal L4. The detection unit 17 may detect the power of the optical output signal L4 by detecting a monitor light which is a part of the optical output signal L4. Specifically, the detection unit 17 detects the monitor light split from the optical output signal L4, and converts the monitor light into a current signal (photocurrent). The detection unit 17 outputs the photocurrent to the bias supplying unit 30. The detection unit 17 is, for example, a photodiode. The photodiode outputs a photocurrent substantially proportional to the power of the monitor light. The power of the optical output signal L4 can be expressed by, for example, a linear expression using the power of the monitor light as a variable, which is substantially proportional to the power of the monitor light. Therefore, by detecting the power of the monitor light, the power of the optical output signal L4 is estimated (detected) with high accuracy. As described above, since an average power of the monitor light is detected and used for the detection of the power of the optical output signal L4, the optical-to-electrical conversion may be slower than a symbol rate of QPSK, for example, and the bandwidth of the photodiodes included in the detection unit 17 may be several GHz, for example. The detection unit 27 has the same function as the detection unit 17 except that it detects a monitor light split from the optical output signal L5, and therefore a detailed description thereof is omitted. The detection units 17 and 27 may be included in the optical modulators 10 and 20, respectively.

The driving unit 19 generates a differential voltage signal (driving signal) based on a transmission data signal output from a host device (external device, not shown) or the like. The driving signal has a normal phase signal (a positive phase signal) and a reverse phase signal (a negative phase signal). The reverse phase signal has a phase that differs from the phase of the normal phase signal by 180°. For example, when the normal phase signal increases, the reverse phase signal decreases, and when the normal phase signal decreases, the reverse phase signal increases. The reverse phase signal reaches a minimum value (bottom value) when the normal phase signal reaches a maximum value (peak value), and the reversed phase signal reaches a peak value when the normal phase signal reaches a bottom value. The normal phase signal and the reverse phase signal have substantially the same amplitude. The driving unit 19 supplies four driving signals to the inner modulators 11 and 12 and the inner modulators 21 and 22. Specifically, the driving unit 19 applies a driving signal Vd1 (first driving signal) to an electrode 13a provided on the optical waveguide 11a and an electrode 13b provided on the optical waveguide 11b, and applies a driving signal Vd2 (second driving signal) to an electrode 14a provided on the optical waveguide 12a and an electrode 14b provided on the optical waveguide 12b. The inner modulator 11 phase-modulates the split light L21 in accordance with the driving signal Vd1, and the inner modulator 12 phase-modulates the split light L22 in accordance with the driving signal Vd2.

The driving signal Vd1 includes a "high level" state and a "low level" state as binary states. The driving signal Vd1 is generated on the basis of the transmission data signal mentioned above, and includes a normal phase signal and a reverse phase signal having opposite phases to each other. For example, when the driving signal Vd1 is at the "high level", the normal phase signal has a peak value, and the reverse phase signal has a bottom value. That is, the difference obtained by subtracting the voltage of the reverse phase signal from the voltage of the normal phase signal becomes a positive value and becomes a maximum value. When the driving signal Vd1 is at the "low level", the normal phase signal has a bottom value, and the reverse phase signal has a peak value. That is, the difference obtained by subtracting the voltage of the reverse phase signal from the voltage of the positive phase signal becomes a negative value and becomes a minimum value. For example, the driving unit 19 applies the normal phase signal of the driving signal Vd1 to the electrode 13a, and applies the reverse phase signal of the driving signal Vd1 to the electrode 13b. The modulated optical signal L41 is an optical signal modulated by BPSK by the inner modulator 11.

The driving signals Vd2 include a "high level" state and a "low level" state as binary states. The driving signal Vd2 is generated on the basis of the transmitted data signal, and includes a normal phase signal and a reverse phase signal having opposite phases to each other. For example, when the driving signal Vd2 is at the "high level", the normal phase signal has a peak value, and the reverse phase signal has a bottom value. That is, the difference obtained by subtracting the voltage of the reverse phase signal from the voltage of the normal phase signal becomes a positive value and becomes a maximum value. When the driving signal Vd2 is at the "low level", the normal phase signal has a bottom value, and the reverse phase signal has a peak value. That is, the difference obtained by subtracting the voltage of the reverse phase signal from the voltage of the positive phase signal becomes a negative value and becomes a minimum value. The driving unit 19 applies the normal phase signal of the driving signal Vd2 to the electrode 14a, and applies the reverse phase signal of the driving signal Vd2 to the electrode 14b. The modulated optical signal L42 is an optical signal modulated by BPSK by the inner modulator 12. The driving unit 19 also applies driving signals to electrodes 23a and 23b provided on the optical waveguides 21a and 21b, and to electrodes 24a and 24b provided on the optical waveguides 22a and 22b, respectively, but illustration thereof is omitted.

The bias supplying unit 30 supplies bias voltages to the inner modulators 11, 12, and to the outer modulator 15. The bias supplying unit 30 supplies bias voltages to the inner modulator 21, 22, and the outer modulator 25. Specifically, the bias supplying unit 30 applies a bias voltage Vc1 (first bias voltage) to the electrodes 13a and 13b, a bias voltage Vc2 (second bias voltage) to the electrodes 14a and 14b, and a bias voltage Vp (third bias voltage) to the electrodes 16a and 16b. The electrode 16a is provided on the optical waveguide 15a, and the electrode 16b is provided on the optical waveguide 15b.

The bias voltage Vc1 is a potential difference between a voltage applied to the electrode 13a and a voltage applied to the electrode 13b, and is a reference voltage (first reference voltage) for the driving signal Vd1. For example, when the bias voltage Vc1 is adjusted to an optimum voltage value, and when the driving signal Vd1 is at the low level, the phase of the modulated optical signal L41 is shifted by 0° with respect to the phase of the split light L21 (here, "shifted by 0°" is a convenient expression, and in this condition, the modulated optical signal L41 has the same phase as the phase of the split light L21). That is, the phase difference of the modulated optical signal L41 with respect to the split light L21 (hereinafter referred to as the "phase difference of the modulated optical signal L41") is 0°. When the driving signal Vd1 is at the high level, the phase of the modulated optical signal L41 is shifted by 180° from the phase of the split light L21. That is, the phase difference of the modulated optical signal L41 is 180°. As in this example, the modulated optical signal L41 is in either a state in which the phase difference is 0° or a state in which the phase difference is 180° in accordance with the driving signal Vd1.

The bias voltage Vc2 is a potential difference between a voltage applied to the electrode 14a and a voltage applied to the electrode 14b, and is a reference voltage (second reference voltage) of the driving signals Vd2. For example, when the bias voltage Vc2 is adjusted to an optimum voltage value, and when the driving signal Vd2 is at the low level, the phase of the modulated optical signal L42 is shifted by 0° with respect to the phase of the split light L22. That is, the phase difference of the modulated optical signal L42 with respect to the split light L22 (hereinafter referred to as "phase difference of the modulated optical signal L42") is 0°. When the driving signal Vd2 is at the high level, the phase of the modulated optical signal L42 is shifted by 180° from the phase of the split light L22. That is, the phase difference of the modulated optical signal L42 is 180°. As in this example, the modulated optical signal L42 is in either a state in which the phase difference is 0° or a state in which the phase difference is 180° in accordance with the driving signal Vd2.

The bias voltage Vp is a potential difference between a voltage applied to the electrode 16a and a voltage applied to the electrode 16b. When the bias voltage Vp is set to an optimum voltage value, the phase of the modulated optical signal L41 and the phase of the modulated optical signal L42 are shifted by 90° from each other by the bias voltage Vp. The bias supplying unit 30 supplies bias voltages similar to the bias voltage Vc1, the bias voltage Vc2, and the bias voltage Vp to the electrodes 23a and 23b, the electrodes 24a and 24b, and the electrodes 26a and 26b provided on the optical waveguides 25a and 25b, respectively, but illustration thereof is omitted. In the optical transmitter 1 for DP-QPSK modulation system, the bias supplying unit 30 supplies a total of six bias voltages to the optical modulators 10 and 20.

Figure 2:
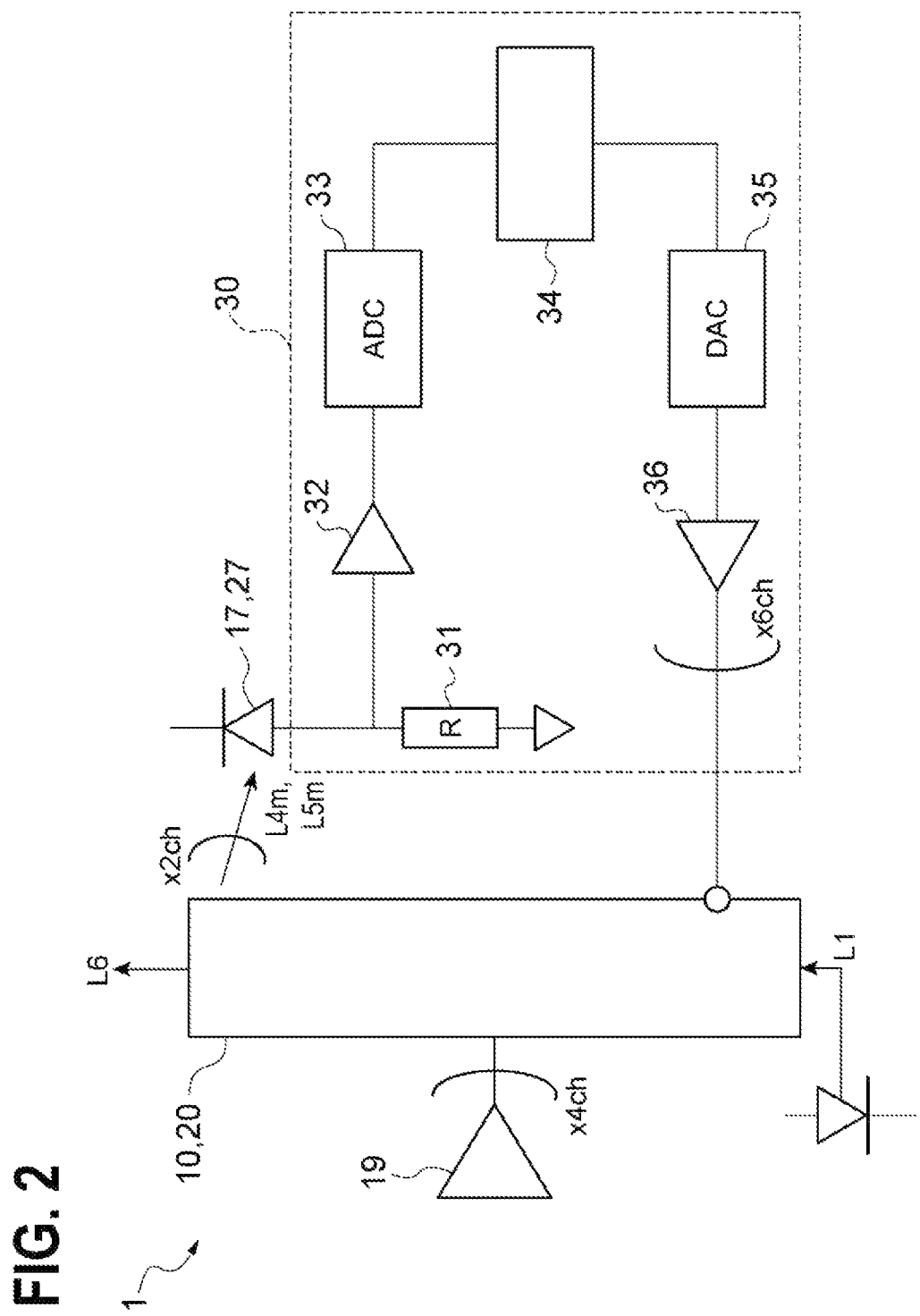
FIG. 2 is a diagram showing a detailed configuration of a bias supplying unit of FIG. 1.

FIG. 2 is a diagram showing a detailed configuration of the bias supplying unit of FIG. 1. The bias supplying unit 30 includes, for example, a resistor 31, an amplifying circuit 32, an ADC (Analog to Digital Converter) 33, a control circuit 34, a DAC (Digital to Analog Converter) 35, and an amplifying circuit 36.

The resistor 31 converts the photocurrent input from the detection units 17 and 27 to the bias supplying unit 30 into a monitor voltage. The monitor voltage is generated based on a voltage drop produced by the photocurrent flowing through the resistor 31. That is, the monitor voltage is a voltage having an analog value substantially proportional to a magnitude of the photocurrent. The resistor 31 outputs the monitor voltage to the amplifying circuit 32. The photocurrent input from the detection unit 17 and the photocurrent input from the detection unit 27 are converted into different monitor voltages by flowing through different resistors 31. In FIG. 2, the detection units 17 and 27 are shown outside the optical modulators 10 and 20, but as described above, the detection units 17 and 27 may be incorporated in the optical modulators 10 and 20, respectively. In this case, for example, terminals for outputting photocurrents may be provided to the optical modulators 10 and 20, respectively, and the detection units 17 and 27 may be connected to the bias supplying unit 30 via the respective terminals.

The amplifying circuit 32 amplifies the monitor voltage. The amplified monitor voltages improve the accuracy of the analog-to-digital conversions performed by the ADC 33. The amplifying circuit 32 is provided with a low-pass filter. The monitor voltage is integrated by passing through a low-pass filter, and the values of the monitor voltage are averaged over time. Therefore, the average power of the monitor light is detected in the bias supplying unit 30. The amplifying circuit 32 outputs the amplified and averaged monitor voltages to the ADC 33. The above-mentioned different monitor voltages generated in accordance with the photocurrent input from the detection unit 17 and the detection unit 27 are amplified by different amplifying circuits 32, respectively.

The ADC 33 converts the monitor voltage output from the amplifying circuit 32 into a monitor value having a digital value. The ADC 33 outputs the monitor value to the control circuit 34. As a result, the monitor value corresponding to the magnitude of the average power of the monitor light is input to the control circuit 34. Although two monitor values based on the detection units 17 and 27 are input to the control circuit 34, FIG. 2 shows only one path through which one monitor value is input. That is, the photocurrent from the detector 17 is converted into one monitor value (digital value) by using the resistor 31, the amplifying circuit 32, and the ADC 33, and the monitor value is input to the control circuit 34. The photocurrent from the detector 27 is converted into another monitor value (digital value) by another resistor 31, another amplifying circuit 32, and another ADC 33, and the another monitor value is input to the control circuit 34.

The control circuit 34 performs a bias voltage adjustment processing for determining the bias voltage in accordance with the average power of the monitor light detected by the detection units 17 and 27. Details of the bias voltage adjustment processing will be described later. By the control circuit 34 performing the bias voltage adjustment processing, the bias supplying unit 30 determines the voltage values of the bias voltages to be supplied to each of the inner modulators 11, 12, and the outer modulator 15 and each of the inner modulators 21, 22, and the outer modulators 25. The control circuit 34 is, for example, an IC (Integrated Circuit) composed of a CPU (Central Processing Unit), a RAM (Random Access Memory), a ROM (Read Only Memory), and the like. The control circuit 34 reads a predetermined program stored in the ROM into the RAM, and executes the program by the CPU to operate so as to perform the bias voltage adjustment processing. The control circuit 34 may be a logic device such as, for example, a CPLD (Complex Programmable Logic Device) or a FPGA (Field Programmable Gate Array). The control circuit 34 outputs a digital value corresponding to the voltage value of the bias voltage to the DAC 35.

The DAC 35 generates a set voltage, which is an analogue voltage, based on the digital value output from the control circuit 34. The DAC 35 outputs the set voltage to the amplifying circuit 36.

The amplifying circuit 36 generates a bias voltage by amplifying the set voltage output from the DAC 35. The amplifying circuit 36 supplies the generated bias voltage to the optical modulators 10 and 20. The control circuit 34 adjusts the voltage value of the bias voltage supplied to the each modulators by changing the set value to be output to the DAC 35. Although six bias voltages are supplied to the optical modulators 10 and 20 via the DAC 35 and the amplifying circuits 36, FIG. 2 shows one path through which one bias voltage is supplied. Therefore, in reality, the DACs 35 and the amplifying circuits 36 are respectively prepared by the number of bias voltages, and are used by being connected to the control circuit 34 in parallel with each other. More specifically, as described above, one bias voltage is given as the difference between the voltages applied to the electrodes provided on each of the pair of optical waveguides, so that two voltages are output from the amplifying circuit 36. Alternatively, a single DAC 35 and a single amplifying circuit 36 may apply a single voltage to the single electrode provided on the optical waveguide. In this case, twelve DACs 35 and twelve amplifier circuits 36 are provided. The bias supplying unit 30 outputs twelve voltages, and applies the voltages to the electrodes 13a and 13b, the electrodes 14a and 14b, the electrodes 16a and 16b, the electrodes 23a and 23b, the electrodes 24a and 24b, and the electrodes 26a and 26b via mutually different wirings.

Figure 3:
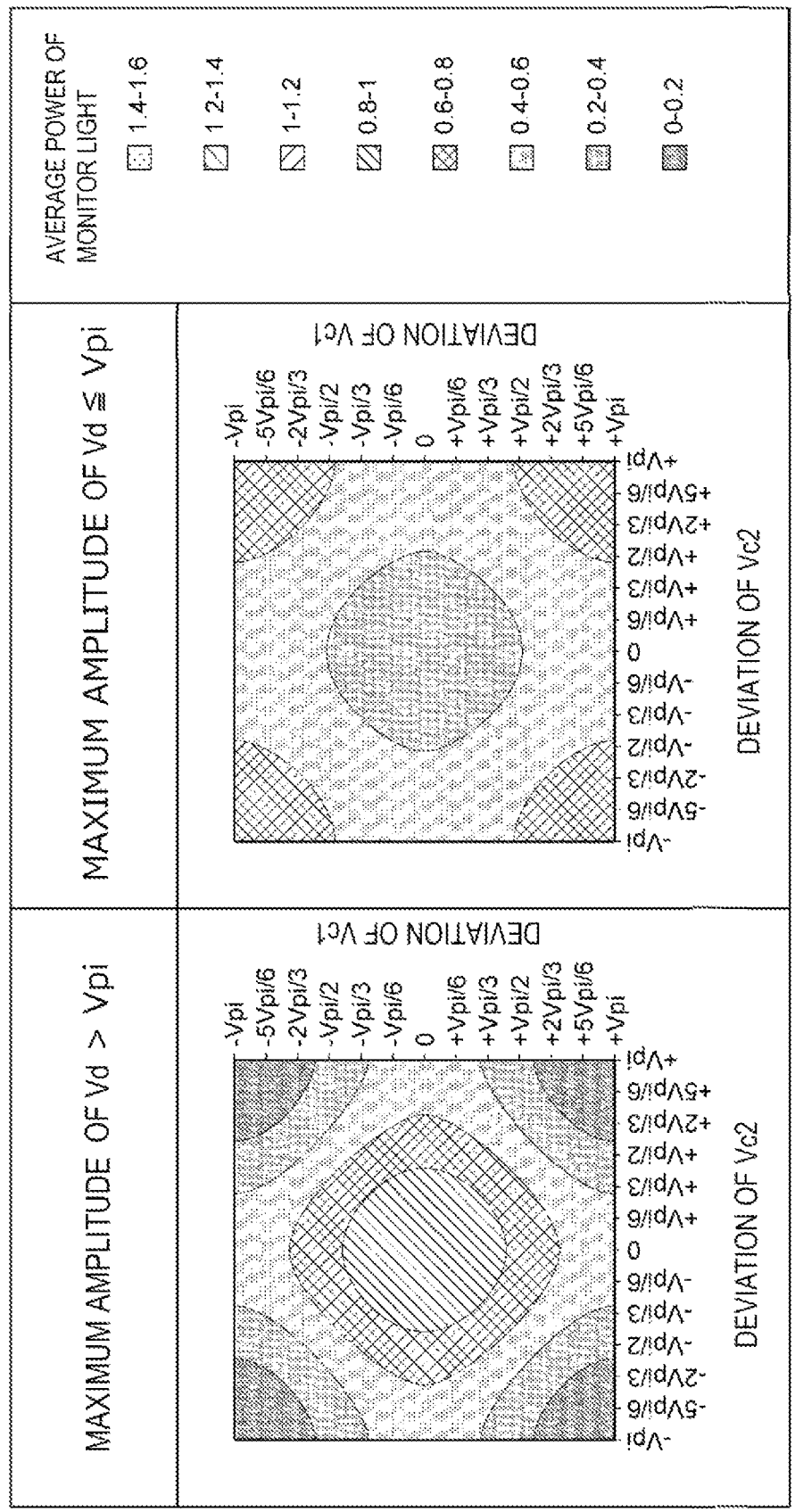
FIG. 3 shows an example of a calculation result of an average power of a monitor light in an optical modulator shown in FIG. 1.
Figure 4:
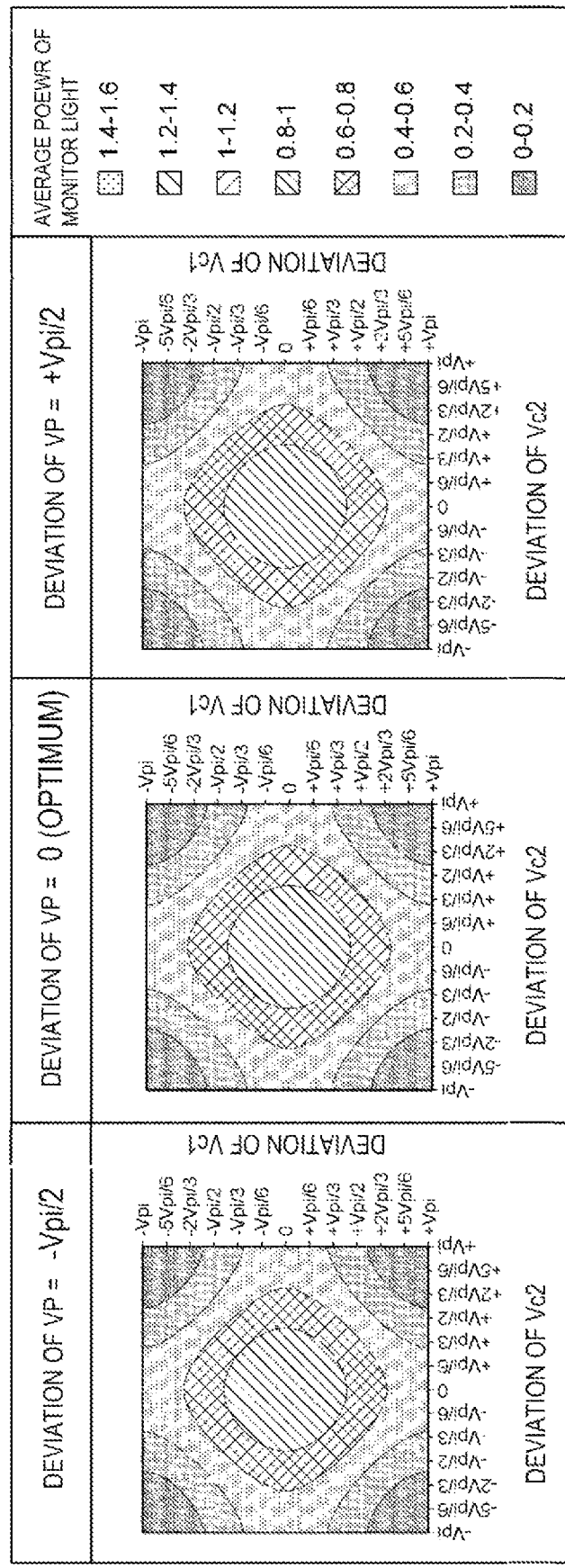
FIG. 4 shows an example of a calculation result of an average power of a monitor light when a maximum amplitude of a driving signal is larger than a half-wavelength voltage.
Figure 5:
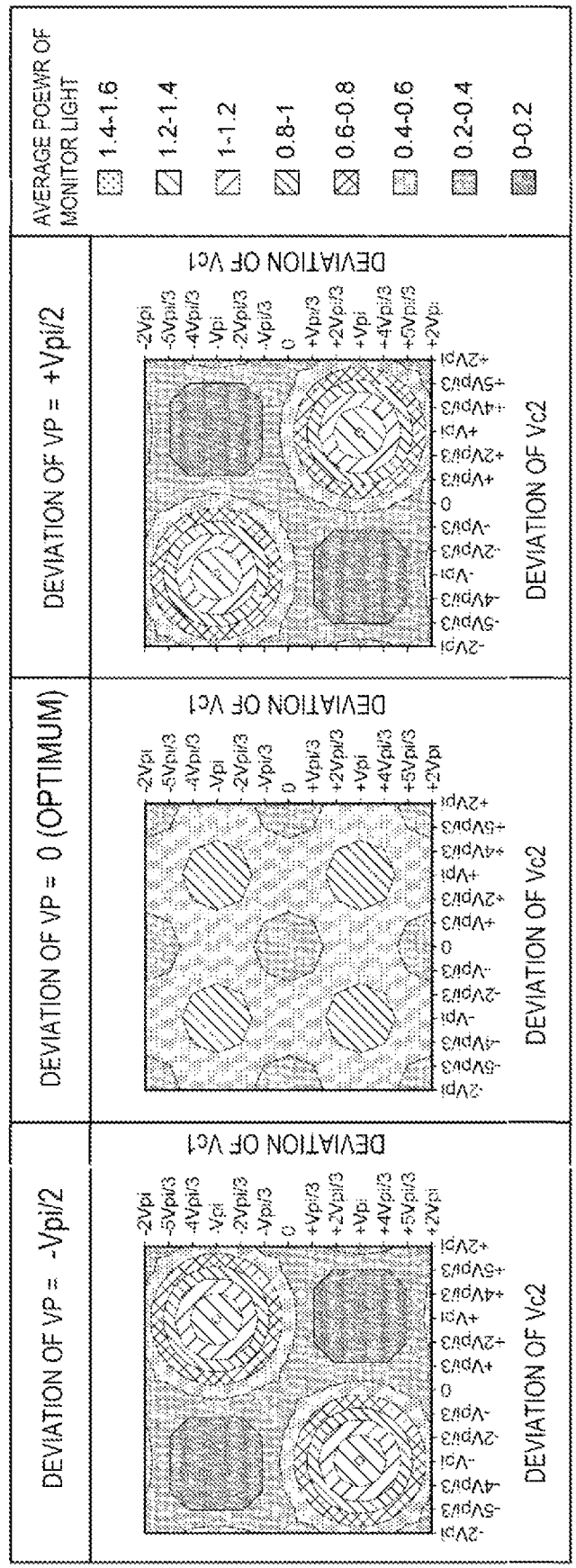
FIG. 5 shows an example of a calculation result of an average power of a monitor light when a maximum amplitude of a driving signal is equal to or less than a half-wavelength voltage.
Figure 6:
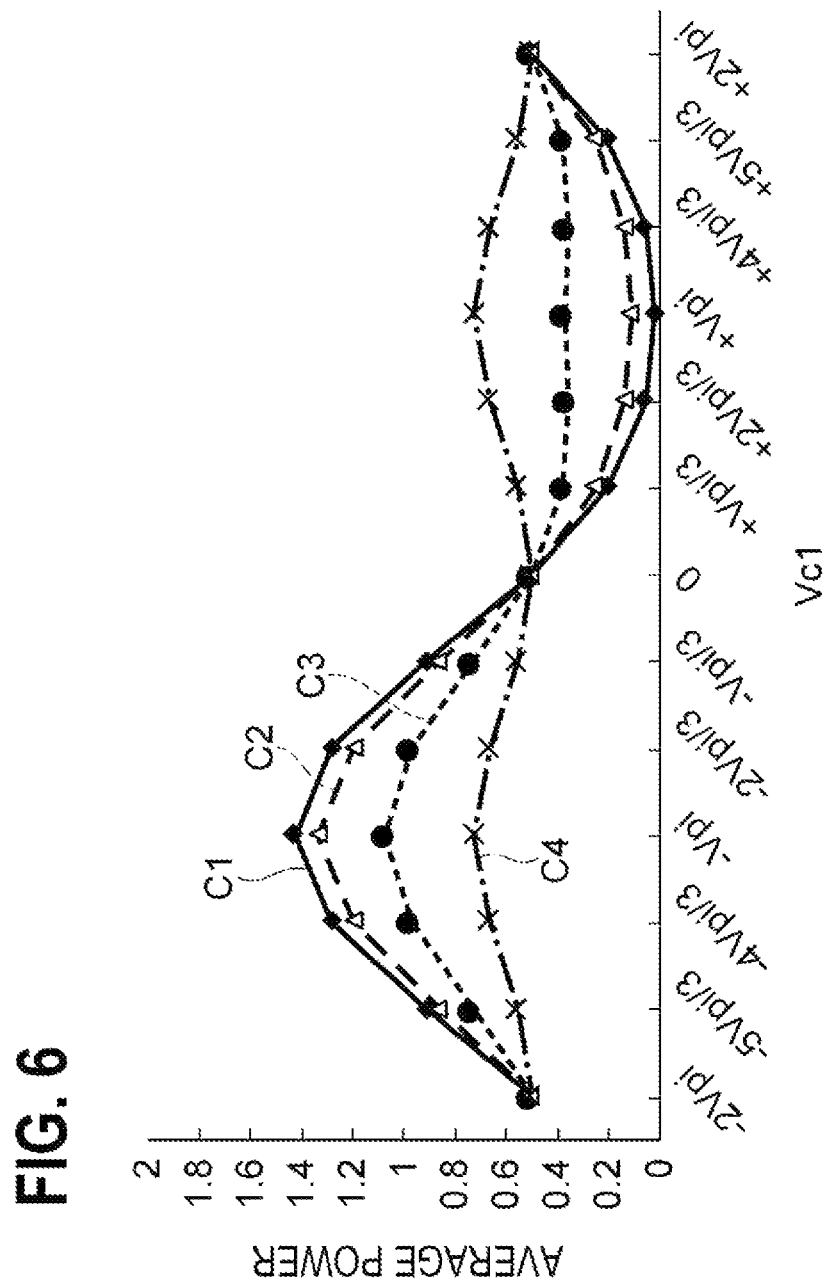
FIG. 6 is a graph showing an example of a calculation result of average powers of a monitor light in accordance with a bias voltage in one inner modulator.
Figure 7:
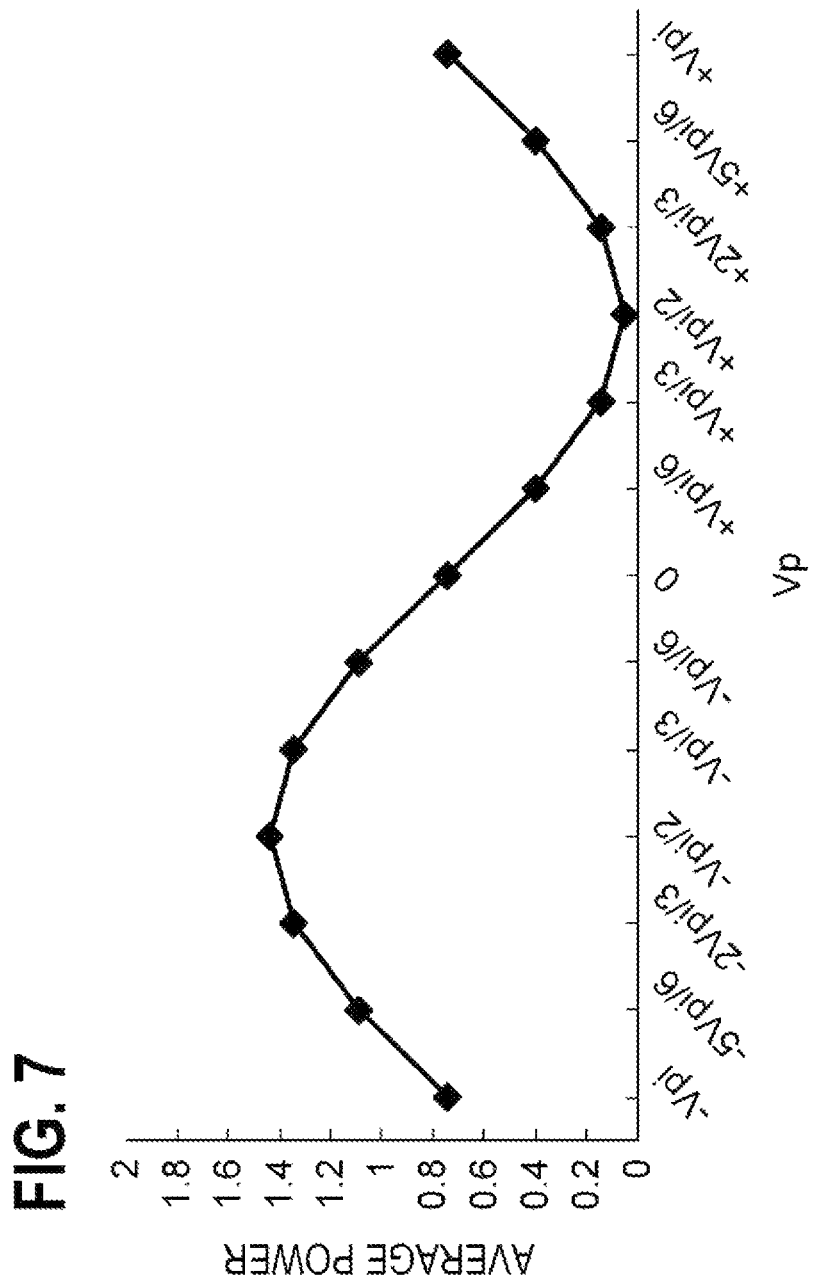
FIG. 7 is a graph showing an example of a calculation result of an average power of a monitor light in accordance with a bias voltage in another inner modulator.

Next, the relationship between the bias voltage and the average power of the monitor light will be explained using theoretical calculation values with reference to FIGS. 3 to 7. FIG. 3 shows an example of the calculation result of the average power of the monitor light in the optical modulator shown in FIG. 1. FIG. 4 shows an example of the calculation result of the average power of the monitor light when the maximum amplitude of the driving signal is larger than the half-wavelength voltage value. FIG. 5 shows an example of the calculation result of the average power of the monitor light when the maximum amplitude of the driving signal is equal to or less than the half-wavelength voltage value. FIG. 6 is a graph showing an example of the calculation result of the average power of the monitor light according to the bias voltage of one inner modulator. FIG. 7 is a graph showing an example of the calculation result of the average power of the monitor light according to the bias voltage of an outer modulator.

FIG. 3 shows the relation of a voltage value of the bias voltage Vc1 and the voltage value of the bias voltage Vc2 versus the average power of the monitor light. FIG. 3 shows the above-described relations, one for when maximum amplitudes of the driving signals Vd1, Vd2 are larger than the half-wavelength voltage Vpi and another for when the maximum amplitudes of the driving signals Vd1, Vd2 are equal to or smaller than the half-wavelength voltage Vpi. Each relation is a calculation result when the bias voltage Vp is set to an optimum voltage value. The half-wavelength voltage Vpi is a voltage value for changing the phase of the optical signal by 180° in either the inner modulator 11 or the inner modulator 12, and is a known value (theoretical value) obtained by calculation. When a voltage is applied between a pair of electrodes provided on a pair of optical waveguides included in the optical modulator 10 so that an potential difference therebetween equals to the half-wavelength voltage Vpi, a phase difference between the optical signals output from the pair of optical waveguides becomes 180°. The bias voltage Vp is set to an optimum voltage value at which the phase difference between the modulated optical signal L41 and the modulated optical signal L42 is 90°.

Here, the calculated value of the average power is shown using the contour lines spaced with every 0.2 mW. In FIG. 3, the vertical axis represents the deviation of the bias voltage Vc1 from the optimum voltage value, and when the value of the vertical axis is 0, the bias voltage Vc1 coincides with the optimum voltage value. The horizontal axis represents the deviation of the bias voltage Vc2 from the optimum voltage value, and when the value on the horizontal axis is 0, the bias voltage Vc2 coincides with the optimum voltage value. When the bias voltage Vc1 is set to the optimum voltage value, the phase difference of the modulated optical signal L41 is 180° with the driving signal Vd1 being at the high level. When the bias voltage Vc2 is set to the optimum voltage value, the phase difference of the modulated optical signal L42 is 180° with the driving signal Vd2 being at the high level. On the vertical axis and the horizontal axis of FIG. 3, when the values of the respective axes are +Vpi, the bias voltages Vc1, Vc2 deviate from the optimum voltage values by the half-wavelength voltage Vpi corresponding to the phase difference of 180°. When the values of the respective axes are −Vpi, the bias voltages Vc1, Vc2 deviate from the optimum voltage values by the voltage value −Vpi corresponding to the phase difference of −180°.

As shown in FIG. 3, when the maximum amplitudes of the driving signal Vd1, Vd2 are larger than the half-wavelength voltage Vpi, the average power of the monitor light becomes the maximum with the bias voltage Vc1, Vc2 having the optimum voltage values. When the maximum amplitudes of the driving signal Vd1, Vd2 are equal to or smaller than the half-wavelength voltage Vpi, the average power of the monitor light is minimum with the bias voltages Vc1, Vc2 having the optimum voltage values. In FIG. 3, since the calculated average power is shown in units of 0.2 mW, the average power seems maximum or minimum over a wide range of voltage values of the bias voltage Vc1 and the bias voltage Vc2, but in actual calculation, only when the bias voltage Vc1 and the bias voltage Vc2 are set to the optimum voltage values, the average power is maximum or minimum.

By setting the maximum amplitudes of the driving signals Vd1, Vd2 being equal to or less than the half-wavelength voltage Vpi, for example, a power consumed by the driving signals Vd1, Vd2 can be reduced, or the optical modulator can be applicable to QAM modulation (Quadrature Amplitude Modulation) in which linear optical responses are required for the inner modulators 11 and 12.

As described above, under the condition that the bias voltage Vp is set to the optimum voltage value, when the maximum amplitudes of the driving signals Vd1, Vd2 are larger than the half-wavelength voltage Vpi, the optimum voltage values of the bias voltages Vc1, Vc2 are obtained by adjusting the voltage values of the bias voltages Vc1, Vc2 so that the average power of the monitor light becomes the maximum. Similarly, under the condition that the bias voltage Vp is set to the optimum voltage value, when the maximum amplitudes of the driving signals Vd1, Vd2 are equal to or less than the half-wavelength voltage Vpi, the optimum voltage values of the bias voltages Vc1, Vc2 are obtained by adjusting the voltage values of the bias voltages Vc1, Vc2 so that the average power of the monitor light becomes minimum. However, the bias voltage Vp is not always set to an optimum voltage value. Therefore, the relationship between the voltage values of the bias voltages Vc1, Vc2 and the average power of the monitor light when the bias voltage Vp fluctuates will be described below.

FIG. 4 shows the result of calculating the average power at each of the three voltage values of the bias voltage Vp when the maximum amplitudes of the driving signals Vd1, Vd2 are larger than the half-wavelength voltage Vpi. FIG. 5 shows the result of calculating the average power at each of the three voltage values of the bias voltage Vp when the maximum amplitudes of the driving signals Vd1, Vd2 are equal to or less than the half-wavelength voltage Vpi. As the three voltage values of the bias voltage Vp, the optimum voltage value of the bias voltage Vp, a voltage value smaller than the optimum voltage value by Vpi/2, and a voltage value larger than the optimum voltage value by Vpi/2 are used.

In order to simplify the explanation, for the case of the maximum amplitudes of the driving signals Vd1, Vd2 being larger than the half-wavelength voltage Vpi (FIG. 4), the calculation result is shown in which the bias voltages Vc1, Vc2 are changed from values deviated from the optimum voltage values by the half-wavelength voltage Vpi to a value deviated from the optimum voltage value by the voltage −Vpi. On the other hand, for the case of the maximum amplitudes of the driving signals Vd1, Vd2 being equal to or less than the half-wavelength voltage Vpi (FIG. 5), the calculation result is shown in which the bias voltages Vc1, Vc2 are changed from values deviated from the optimum values by twice of the half-wavelength the voltage of Vpi (voltage value 2Vpi) to a value deviated from the optimum voltage value by twice of the voltage of −Vpi (voltage value −2Vpi).

As shown in FIG. 4, when the maximum amplitudes of the driving signals Vd1, Vd2 are larger than the half-wavelength voltage Vpi, the average power becomes maximum when the bias voltages Vc1, Vc2 are the optimum voltage values regardless of the voltage value of the bias voltage Vp. On the other hand, as shown in FIG. 5, when the maximum amplitudes of the driving signals Vd1, Vd2 are equal to or less than the half-wavelength voltage Vpi, the voltage values of the bias voltages Vc1, Vc2 at which the average power becomes the minimum differs from each other for the three voltage values of the bias voltage Vp. From these calculated results, when the maximum amplitudes of the driving signals Vd1, Vd2 are larger than the half-wavelength voltage Vpi, the optimum values of the bias voltages Vc1, Vc2 can be obtained by adjusting the bias voltages Vc1, Vc2 so that the average power becomes maximum regardless of the voltage value of the bias voltage Vp. On the other hand, when the maximum amplitudes of the driving signals Vd1, Vd2 are equal to or less than the half-wavelength voltage Vpi, even if the bias voltages Vc1, Vc2 are adjusted so that the average power becomes minimum, the optimum values of the bias voltages Vc1, Vc2 cannot be obtained. Therefore, when the maximum amplitudes of the driving signals Vd1, Vd2 are equal to or less than the half-wavelength voltage Vpi, the optimum voltage value of the bias voltage needs to be obtained by a method other than the method of adjusting the bias voltages Vc1, Vc2 so that the average power becomes minimum.

FIG. 6 shows the results of calculating the average power when the voltage value of the bias voltage Vc2 is fixed and the bias voltage Vc1 is changed. The average power shown in FIG. 6 was calculated under the condition that the maximum amplitudes of the driving signals Vd1, Vd2 were set to be equal to or less than the half-wavelength voltage Vpi, and the bias voltage Vc2 was fixed to a value deviated from the optimum voltage value by the voltage Vpi. FIG. 6 shows the results of calculations in which the voltage value of the bias voltage Vc1 is changed from a value deviated from the optimum voltage value by the voltage value −2Vpi to a value deviated from the optimum voltage value by the voltage value 2Vpi. In other words, the calculation result is shown in which the voltage value of the bias voltage Vc1 is changed in a range of four times the half-wavelength voltage Vpi with the optimum voltage value as the center.

The graph C1 is a calculation result when the bias voltage Vp is fixed to a value shifted by the voltage value (−Vpi/2) from the optimum voltage value. The graph C2 is a calculation result when the bias voltage Vp is fixed to a value shifted from the optimum voltage value by the voltage value (−Vpi/3). The graph C3 is a calculation result when the bias voltage Vp is fixed to a value shifted by the voltage value (−Vpi/6) from the optimum voltage value. The graph C4 is a calculation result when the bias voltage Vp is fixed to an optimum voltage value.

As shown in graphs C1 to C4, the average power of the monitor light periodically changes with a period of four times the half-wavelength voltage Vpi with respect to the change of the bias voltage Vc1 (as mentioned above, only the range of four times the half-wavelength voltage Vpi is shown in FIG. 6). Specifically, as shown in graphs C1 to C3, when the bias voltage Vp deviates from the optimum voltage value by the voltage values (−Vpi/2), (−Vpi/3), and (−Vpi/6), a maximum value and a minimum value of the average power of the monitor light appear once each while the voltage value of the bias voltage Vc1 changes by four times the half-wavelength voltage Vpi. When the bias voltage Vc1 is deviated from the optimum voltage value by the voltage value −Vpi, the average power of the monitor light is maximized.

As shown in the graph C4, when the bias voltage Vp is the optimum voltage value, a maximum value and a minimum value of the average power appear once each while the voltage value of the bias voltage Vc1 changes twice as much as the half-wavelength voltage Vpi. When the bias voltage Vc1 deviates from the optimum voltage value by −Vpi, and when it deviates from the optimum voltage value by Vpi, the average power of the monitor light is maximized. That is, in the calculation results shown by graphs C1 to C4, the voltage value of the bias voltage Vc1 at which the average power is maximized is included in the range of four times the half-wavelength voltage Vpi. The average powers of the monitor lights also change periodically with respect to changes in the bias voltages Vc2. For example, when the inner modulator 12 has substantially the same electric and optical characteristics as those of the inner modulator 11 with respect to the phase modulation of the optical signal, the voltage value of the bias voltage Vc2 at which the average power is maximized is included in the range four times the half-wavelength voltage Vpi, similarly to the bias voltage Vc1.

FIG. 7 shows the result of calculating the average power of the monitor light when the bias voltage Vp is changed while the voltage values of the bias voltage Vc1 and the bias voltage Vc2 are fixed. The average power shown in FIG. 7 was calculated under the condition that the maximum amplitudes of the driving signals Vd1, Vd2 were set to the half-wavelength voltage Vpi or less, the bias voltage Vc1 was fixed to a value deviated from the optimum voltage value by the voltage −Vpi, and the bias voltage Vc2 was fixed to a value deviated from the optimum voltage value by the voltage Vpi. In FIG. 7, the horizontal axis represents the amount of deviation of the bias voltage Vp from the optimum voltage value, and when the value is 0, the bias voltage Vp is set to the optimum voltage value. FIG. 7 shows a calculation result in which the voltage value of the bias voltage Vp is changed in a range from a value deviated from the optimum voltage value by the voltage −Vpi to a value deviated from the optimum voltage value by the voltage Vpi. In other words, the calculation result is shown in which the voltage value of the bias voltage Vp is changed in a range twice as large as the half-wavelength voltage Vpi with the optimum voltage value as the center.

As shown in FIG. 7, the average power of the monitor light periodically changes with a period of twice the half-wavelength voltage Vpi with respect to the change of the bias voltage Vp. Specifically, a maximum value and a minimum value of the average power appear once each while the voltage value of the bias voltage Vp changes in a range twice the half-wavelength voltage Vpi. In the calculation result shown in FIG. 7, the average power is maximized when the voltage value of the bias voltage Vp is a value deviated from the optimum voltage value by the voltage −Vpi/2. That is, in the calculation result shown in FIG. 7, the voltage value of the bias voltage Vp in which the average power becomes maximum is included in a range twice as large as the half wavelength voltage Vpi.

In the calculation result of the average power shown in FIG. 5, when the bias voltage Vp deviates from the optimum voltage value by −Vpi/2, the average power is maximized when the voltage values of the bias voltages Vc1, Vc2 deviate from the optimum voltage values by (−Vpi, Vpi) or (Vpi, −Vpi). When the bias voltage Vp deviates from the optimum voltage value by Vpi/2, the average power is maximized when the voltage values of the bias voltages Vc1, Vc2 deviate from the optimum voltage values by (−Vpi, −Vpi) or (Vpi, Vpi). When the bias voltage Vp is on the optimum voltage value, the average power is maximized when the bias voltages Vc1, Vc2 are deviated from the optimum voltage values by (−Vpi, −Vpi), (−Vpi, Vpi), (Vpi, −Vpi) or (Vpi, Vpi). These combinations of the bias voltages Vc1, Vc2 at which the average power is maximized are values deviated by ±Vpi from the optimum voltage values of the bias voltages Vc1, Vc2.

Note that even when the bias voltage Vp has a voltage value other than the above-mentioned voltage values or the voltage values shown in FIG. 6, similarly, the combination of the bias voltages Vc1, Vc2 at which the average power is maximized were deviated by ±Vpi from the optimum voltage values of the bias voltages Vc1, Vc2. From these results, it is understood that the optimum voltage values of the bias voltages Vc1, Vc2 are obtained by adding or subtracting the half-wavelength voltage Vpi to or from the voltage values of the bias voltages Vc1, Vc2 at which the average power of the monitor light is maximized, regardless of the voltage value of the bias voltage Vp.

In the calculation result of the average power shown in FIG. 7, when the voltage value of the bias voltage Vp is a value deviated from the optimum voltage value by −Vpi/2, the average power is maximized. FIG. 7 shows only the result of calculating the average power when the voltage values of the bias voltages Vc1, Vc2 are fixed to one point, but when the bias voltages Vc1, Vc2 are fixed to other points, the average power is maximized when the voltage value of the bias voltage Vp deviates from the optimum voltage value by −Vpi/2 or Vpi/2. From this result, it is understood that the optimum voltage value of the bias voltage Vp is a value obtained by adding or subtracting the half of the half wavelength voltage Vpi (i.e. the value of Vpi/2) to or from the voltage value of the bias voltage Vp at which the average power of the monitor light is maximized, regardless of the voltage values of the bias voltages Vc1, Vc2.

As shown in FIG. 6, the variation of the average power with respect to the voltage value of the bias voltage Vc1 has a periodicity up to four times the half-wavelength voltage Vpi. Based on the result of calculating the average power when the bias voltage Vc2 is changed in the same manner as the bias voltage Vc1, the variation in the average power with respect to the voltage value of the bias voltage Vc2 has a periodicity up to four times the half-wavelength voltage Vpi. As shown in FIG. 7, the variation of the average power with respect to the voltage value of the bias voltage Vp has a periodicity in a range of at most twice the half-wavelength voltage Vpi. In the following, we explain how to adjust the bias voltages using the above-mentioned relationships.

The variations in the average power of the monitor light shown in FIGS. 3 to 7 are the results of calculations, and in the actual optical modulator 10, the optimum voltage values of the bias voltages Vc1, Vc2 and Vp for the optical modulator 10 are not uniquely fixed due to, for example, individual differences in the modulators, ambient temperatures of the modulators, aging of the modulators. Therefore, the bias voltages Vc1, Vc2 and Vp are set to the optimum voltage values by the control circuit 34 performing the bias voltage adjustment processing, when, for example, the optical transmitter 1 is boot up for the first time during manufacturing process.

Figure 8:
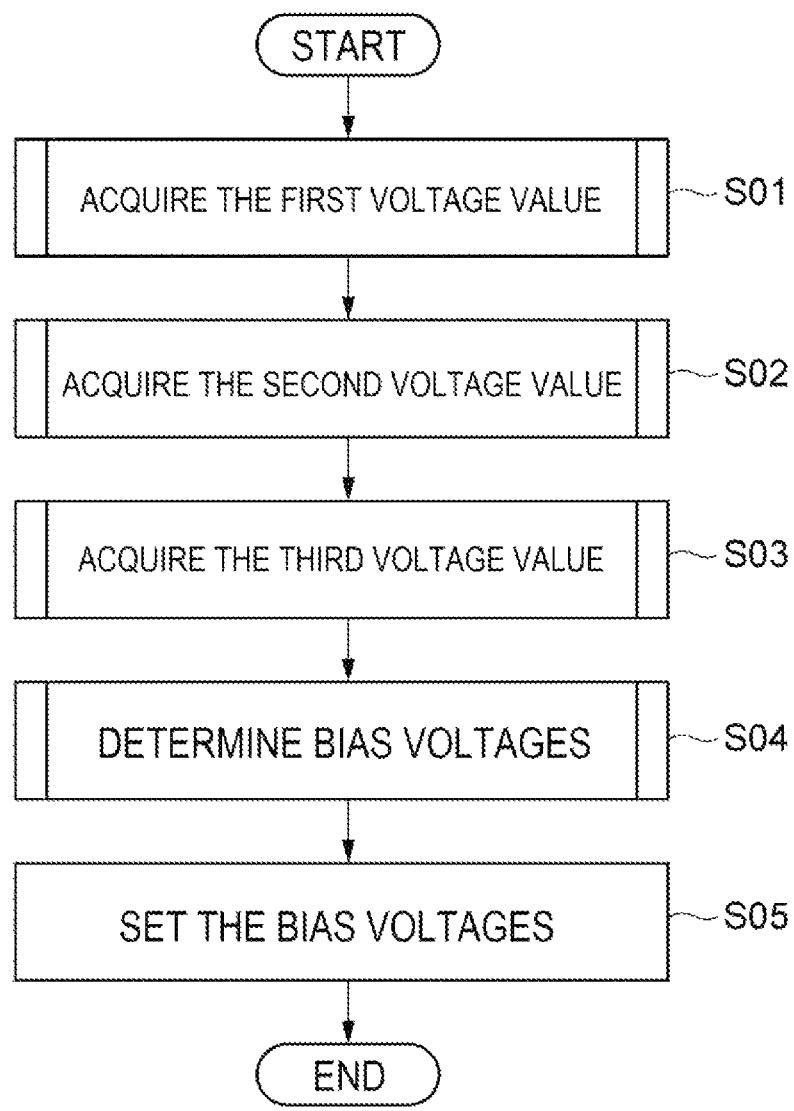
FIG. 8 is a flowchart showing an example of a bias voltage adjustment processing.
Figure 9:
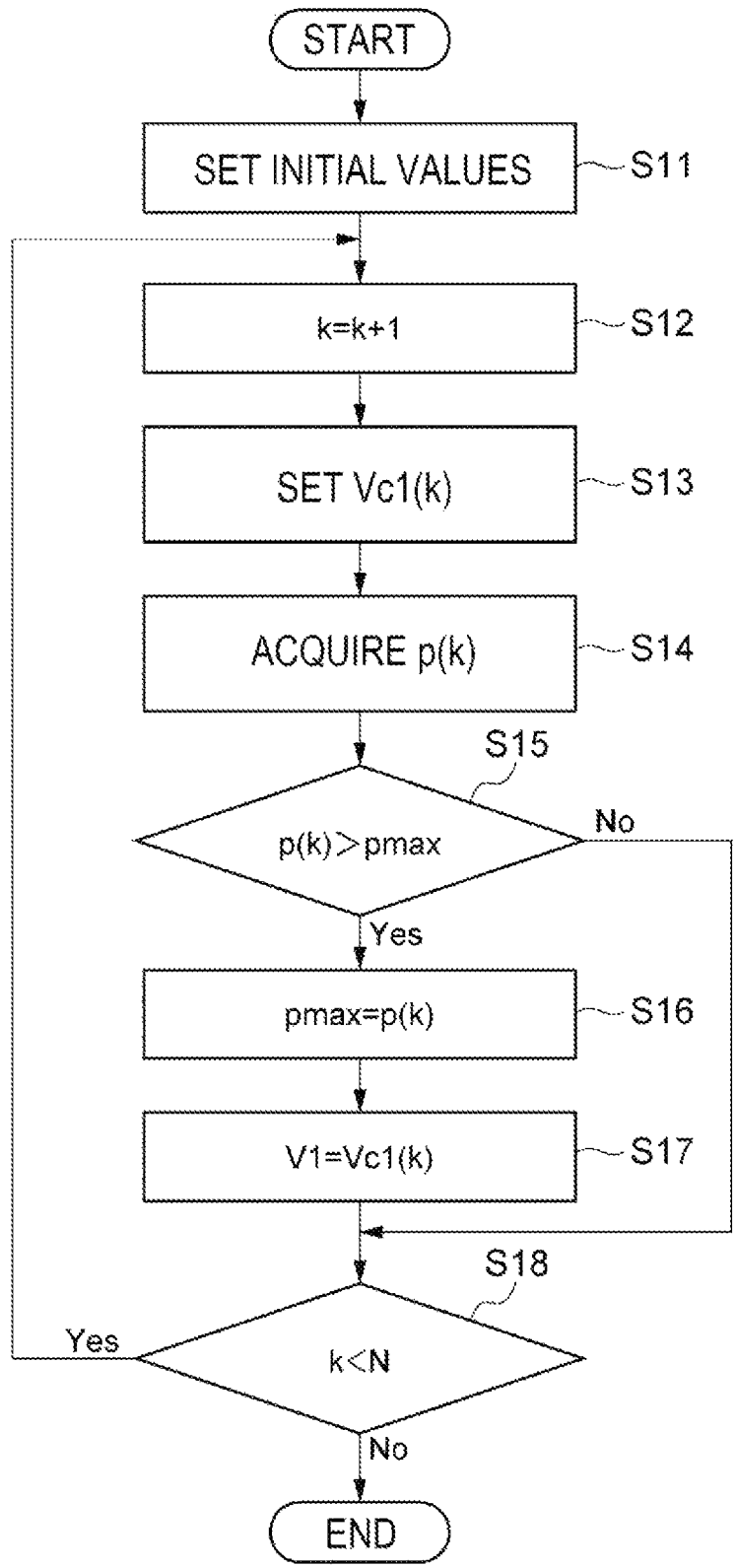
FIG. 9 is a flowchart showing a first voltage value acquisition shown in FIG. 8.
Figure 10:
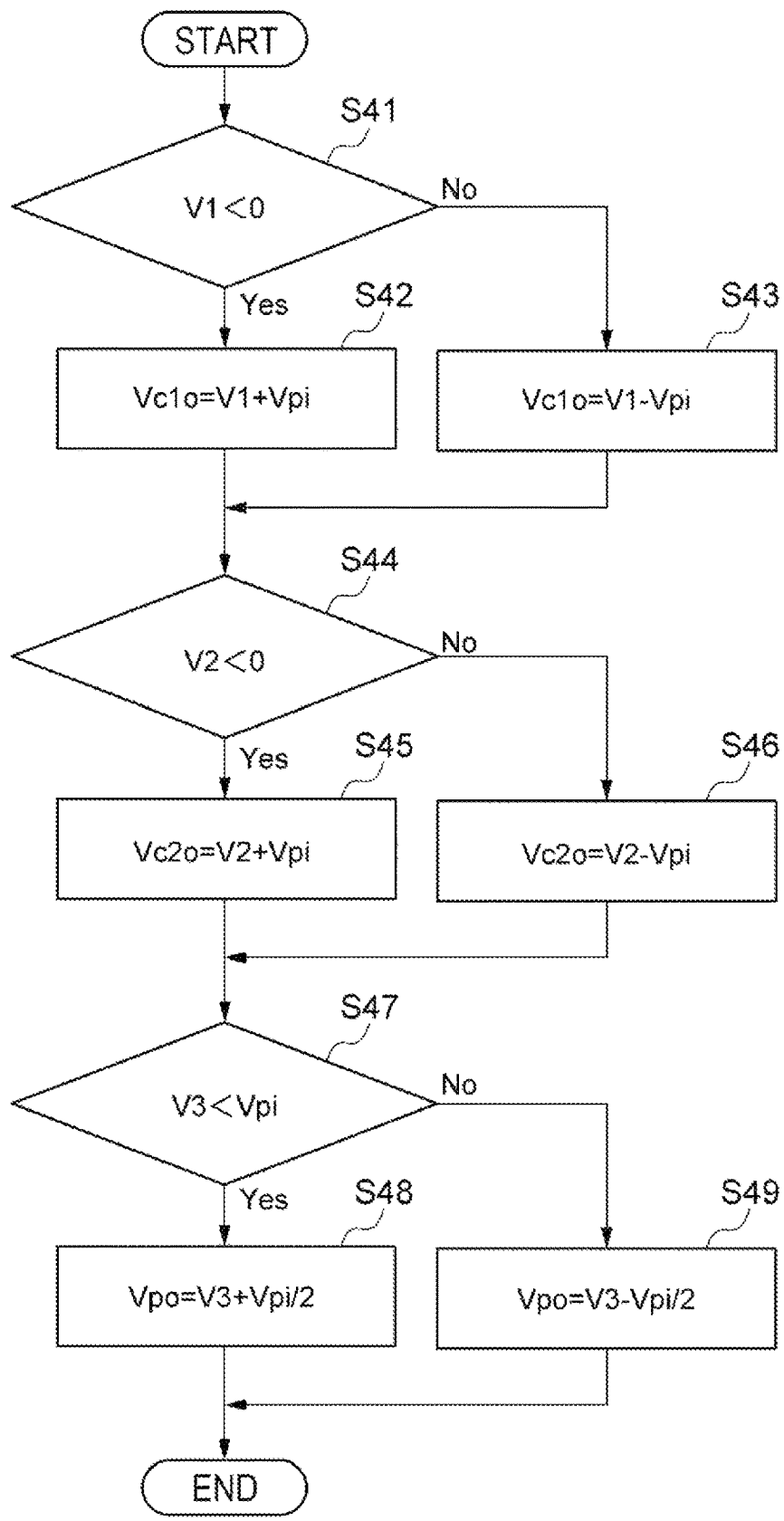
FIG. 10 is a flowchart showing an optimum value determination shown in FIG. 8.

Next, an example of the bias voltage adjustment processing will be described with reference to FIGS. 8 to 10. FIG. 8 is a flowchart showing an example of the bias voltage adjustment processing. FIG. 9 is a flowchart showing a first voltage value acquisition shown in FIG. 8. FIG. 10 is a flowchart showing an optimum value determination shown in FIG. 8. Here, the bias voltage adjustment processing for the bias voltages Vc1, Vc2 and Vp supplied to the optical modulator 10 will be described.

The control circuit 34 stores the voltage values Vc1(0) to Vc1(N), Vc2(0) to Vc2(N), and Vp(0) to Vp(N) for the bias voltages Vc1, Vc2 and Vp in advance. N is an integer of 2 or more. The respective voltage values Vc1($k$), Vc2($k$), and Vp($k$) are array data. The index k is an integer from 0 to N. Here, the control circuit 34 changes the voltage value Vc1($k$) from (−2×Vpi) to (2×Vpi), the voltage value Vc2($k$) from (−2×Vpi) to (2×Vpi), and the voltage value Vp($k$) from 0 to (2×Vpi) by changing the index k from 0 to N. For example, each value of Vc1($k$) and Vc2($k$) is set to {(4×Vpi/N)×k−2×Vpi} by initialization, and each value of Vp($k$) is set to {(2×Vpi/N)×k}. By setting in this manner, the voltages Vc1($k$), Vc2($k$), and Vp($k$) can be easily set without overlapping with each other for the different indexes of k. In the bias voltage adjustment processing, the control circuit 34 stores the monitor value indicating the average power of the monitor light corresponding to the variable k as p(k) of the monitor values p(0) to p(N) as array data. For example, when the optical transmitter 1 is activated, the control circuit 34 starts the bias voltage adjustment processing.

First, in step S01, the control circuit 34 performs the first voltage value acquisition for acquiring a first voltage value V1. Here, the first voltage value V1 is a voltage value of the bias voltage Vc1 at which the average power of the monitor light is maximized when the bias voltage Vc1 is changed while voltage values of the bias voltages Vc2 and Vp are kept constant. The control circuit 34 performs the first voltage value acquisition under a driving condition in which the driving signal Vd1 is supplied to the inner modulator 11 and the driving signal Vd2 is supplied to the inner modulator 12. As shown in FIG. 9, in the first voltage value acquisition, at first, the control circuit 34 performs an initial setting in step S11. Specifically, in step S11, the control circuit 34 sets the variable k to 0. Then, the control circuit 34 sets the bias voltage Vc1 to the voltage value Vc1(0), sets the bias voltage Vc2 to the voltage value Vc2(0), and sets the bias voltage Vp to the voltage value Vp(0). That is, the control circuit 34 sets the voltage values Vc1(0), Vc2(0), and Vp(0) to initial values for the bias voltages Vc1, Vc2 and Vp, respectively. The control circuit 34 outputs the digital values corresponding to the voltage values Vc1(0), Vc2(0), and Vp(0) to the DAC 35, whereby the bias voltage Vc1 of the voltage value Vc1(0) is supplied to the inner modulator 11, the bias voltage Vc2 of the voltage value Vc2(0) is supplied to the inner modulator 12, and the bias voltage Vp of the voltage value Vp(0) is supplied to the outer modulator 15. Further, the control circuit 34 acquires the monitor value p(0) when the bias voltages Vc1,Vc2 and Vp are set to the initial values, sets an initial value of a peak value pmax (temporary candidate value) to the acquired monitor value p(0), and sets an initial value of the first voltage value V1 (temporary candidate value) to the voltage value Vc1(0).

In step S12, the control circuit 34 increments the variable k. That is, the control circuit 34 adds 1 to the variable k. Then, the control circuit 34 sets the bias voltage Vc1 to the voltage value Vc1($k$) (step S13). Specifically, the control circuit 34 outputs a digital value corresponding to the voltage value Vc1($k$) to the DAC 35. At this time, the control circuit 34 maintains the voltage values Vc2(0) and Vp(0) as they are. Therefore, the bias voltage Vc1 of the voltage value Vc1($k$) is supplied to the inner modulator 11, the bias voltage Vc2 of the voltage value Vc2(0) is supplied to the inner modulator 12, and the bias voltage Vp of the voltage value Vp(0) is supplied to the outer modulator 15.

Subsequently, the control circuit 34 acquires the monitor value p(k) (step S14). Then, the control circuit 34 determines whether or not the monitor value p(k) acquired in step S14 is larger than the peak value pmax (step S15). When it is determined that the monitor value p(k) is larger than the peak value pmax (step S15; Yes), the control circuit 34 updates the peak value pmax to the monitor value p(k) (step S16). Then, the control circuit 34 updates the first voltage value V1 to the voltage value Vc1($k$) (step S17). As a result, the voltage value Vc1($k$) at which the monitor value p(k)

becomes larger than the peak value pmax is recorded. On the other hand, when it is determined in step S15 that the monitor value p(k) is equal to or less than the peak value pmax (step S15; No), the control circuit 34 does not update the peak value pmax and the first voltage value V1.

Next, in step S18, the control circuit 34 determines whether or not the variable k is smaller than N. When it is determined that the variable k is smaller than N (step S18: Yes), the control circuit 34 performs the processing from step S12 to step S18 again. On the other hand, if it is determined in step S18 that the variable k is equal to or greater than N (step S18: No), the control circuit 34 ends the first voltage value acquisition. In the first voltage value acquisition, the control circuit 34 obtains the first voltage value V1 in which the average power of the monitor light is maximized by changing the bias voltage Vc1 in a range (first range) from (−2×Vpi) to (2×Vpi) while keeping the voltage values of the bias voltage Vc2 and the bias voltage Vp constant.

Next, in step S02, the control circuit 34 performs a second voltage value acquisition for acquiring a second voltage value V2. Here, the second voltage value V2 is a voltage value of the bias voltage Vc2 at which the average power of the monitor light is maximized when the bias voltage Vc2 is changed while voltage values of the bias voltages Vc1 and Vp are kept constant. The control circuit 34 performs the second voltage value acquisition under the driving condition in which the driving signal Vd1 is supplied to the inner modulator 11 and the driving signal Vd2 is supplied to the inner modulator 12. The second voltage value acquisition is performed in the same manner as the first voltage value acquisition except that the target of changing the voltage value is the bias voltage Vc2. Thus, a flow chart showing the second voltage value acquisition is omitted.

In the second voltage value acquisition, at first, the control circuit 34 performs an initial setting. Specifically, the control circuit 34 sets the variable k to 0, sets the bias voltage Vc1 to the first voltage value V1, sets the bias voltage Vc2 to the voltage value Vc2(0), and sets the bias voltage Vp to the voltage value Vp(0). At this time, the bias voltage Vc1 of the first voltage value V1 is supplied to the inner modulator 11, the bias voltage Vc2 of the voltage value Vc2(0) is supplied to the inner modulator 12, and the bias voltage Vp of the voltage value Vp(0) is supplied to the outer modulator 15. Then, the control circuit 34 acquires the monitor value p(0), sets the initial value of the peak value pmax (temporary candidate value) to the acquired monitor value p(0), and sets the initial value of the second voltage value V2 (temporary candidate value) to the voltage value Vc2(0).

Subsequently, the control circuit 34 increments the variable k (adding 1 to the variable k). Then, the control circuit 34 sets the bias voltage Vc2 to the voltage value Vc2(k). Specifically, the control circuit 34 outputs a digital value corresponding to the voltage value Vc2(k) to the DAC 35. At this time, the bias voltage Vc1 of the first voltage value V1 is supplied to the inner modulator 11, the bias voltage Vc2 of the voltage value Vc2(k) is supplied to the inner modulator 12, and the bias voltage Vp of the voltage value Vp(0) is supplied to the outer modulator 15.

Subsequently, the control circuit 34 acquires the monitor value p(k). Then, the control circuit 34 determines whether or not the acquired monitor value p(k) is larger than the peak value pmax. When it is determined that the monitor value p(k) is larger than the peak value pmax, the control circuit 34 updates the peak value pmax to the monitor value p(k), and updates the second voltage value V2 to the voltage value Vc2(k). On the other hand, when it is determined that the monitor value p(k) is equal to or less than the peak value pmax, the control circuit 34 does not update the peak value pmax and the second voltage value V2.

Subsequently, the control circuit 34 determines whether or not the variable k is smaller than N. When it is determined that the variable k is smaller than N, the control circuit 34 performs the above-described processing except for the initial setting again. On the other hand, when it is determined that the variable k is equal to or greater than N, the control circuit 34 ends the second voltage value acquisition. In the second voltage value acquisition, the control circuit 34 acquires the second voltage value V2 in which the average power of the monitor light is maximized by changing the bias voltage Vc2 in a range (second range) from (−2×Vpi) to (2×Vpi) while keeping the voltage values of the bias voltage Vc1 and the bias voltage Vp constant.

Next, in step S03, the control circuit 34 performs a third voltage value acquisition for acquiring a third voltage value V3. Here, the third voltage value V3 is a voltage value of the bias voltage Vp at which the average power of the monitor light is maximized when the bias voltage Vp is changed while keeping the voltage values of the bias voltages Vc1, Vc2 constant. The control circuit 34 performs the third voltage value acquisition under the driving condition in which the driving signal Vd1 is supplied to the inner modulator 11 and the driving signal Vd2 is supplied to the inner modulator 12. Since the third voltage value acquisition is performed in the same manner as the first voltage value acquisition except that the target of changing the voltage value is the bias voltage Vp, the flowchart showing the third voltage value acquisition is omitted.

In the third voltage value acquisition, first, the control circuit 34 performs an initial setting. Specifically, the control circuit 34 sets the variable k to 0, sets the bias voltage Vc1 to the first voltage value V1, sets the bias voltage Vc2 to the second voltage value V2, and sets the bias voltage Vp to the voltage value Vp(0). At this time, the bias voltage Vc1 of the first voltage value V1 is supplied to the inner modulator 11, the bias voltage Vc2 of the second voltage value V2 is supplied to the inner modulator 12, and the bias voltage Vp of the voltage value Vp(0) is supplied to the outer modulator 15. Then, the control circuit 34 acquires the monitor value p(0), sets the initial value of the peak value pmax (temporary candidate value) to the acquired monitor value p(0), and sets the initial value of the third voltage value V3 (temporary candidate value) to the voltage value Vp(0).

Subsequently, the control circuit 34 increments the variable k (adding 1 to the variable k). Then, the control circuit 34 sets the bias voltage Vp to the voltage value Vp(k). Specifically, the control circuit 34 outputs a digital value corresponding to the voltage value Vp(k) to the DAC 35. At this time, the bias voltage Vc1 of the first voltage value V1 is supplied to the inner modulator 11, the bias voltage Vc2 of the second voltage value V2 is supplied to the inner modulator 12, and the bias voltage Vp of the voltage value Vp(k) is supplied to the outer modulator 15.

Subsequently, the control circuit 34 acquires the monitor value p(k). Then, the control circuit 34 determines whether or not the acquired monitor value p(k) is larger than the peak value pmax. When it is determined that the monitor value p(k) is larger than the peak value pmax, the control circuit 34 updates the peak value pmax to the monitor value p(k), and updates the third voltage value V3 to the voltage value Vp(k). On the other hand, when it is determined that the monitor value p(k) is equal to or less than the peak value pmax, the control circuit 34 does not update the peak value pmax and the third voltage value V3.

Subsequently, the control circuit 34 determines whether or not the variable k is smaller than N. When it is determined that the variable k is smaller than N, the control circuit 34 performs the above-described processing except for the initial setting again. On the other hand, when it is determined that the variable k is equal to or greater than N, the control circuit 34 ends the third voltage value acquisition. In the third voltage value acquiring processing, the control circuit 34 acquires the third voltage value V3 in which the average power of the monitor light is maximized by changing the bias voltage Vp in a range (third range) from 0 to (2×Vpi) while keeping the voltage values of the bias voltage Vc1 and the bias voltage Vc2 constant.

In step S04, the control circuit 34 performs an optimum value determination. In S04, first, the control circuit 34 determines an optimum voltage value Vc1o of the bias voltage Vc1 based on the first voltage value V1. Specifically, the control circuit 34 determines the optimum voltage value Vc1o by adding or subtracting the half-wavelength voltage Vpi to or from the first voltage value V1. The control circuit 34 selects which of addition and subtraction of the half-wavelength voltage Vpi is performed in accordance with the value of the first voltage value V1.

More specifically, as shown in FIG. 10, the control circuit 34 determines whether the first voltage value V1 is smaller than 0 (negative) (step S41). When it is determined that the first voltage value V1 is smaller than 0 (step S41; Yes), the control circuit 34 determines the optimum voltage value Vc1o of the bias voltage Vc1 by using the equation (1) (step S42). In step S42, the control circuit 34 determines the optimum voltage value Vc1o by adding the half-wavelength voltage Vpi to the first voltage value V1. On the other hand, when it is determined in step S41 that the first voltage value V1 is 0 or more (zero or positive) (step S41; No), the control circuit 34 determines the optimum voltage value Vc1o by using the equation (2) (step S43). In step S43, the control circuit 34 subtracts the half-wavelength voltage Vpi from the first voltage value V1 to determine the optimum voltage value Vc1o.

$$Vc1o = V1 + Vpi \quad (1)$$

$$Vc1o = V1 - Vpi \quad (2)$$

Subsequently, the control circuit 34 determines an optimum voltage value Vc2o of the bias voltage Vc2 based on the second voltage value V2. Specifically, the control circuit 34 determines the optimum voltage value Vc2o by adding or subtracting the half-wavelength voltage Vpi to or from the second voltage value V2. The control circuit 34 selects which of addition and subtraction of the half-wavelength voltage Vpi is performed in accordance with the value of the second voltage value V2.

More specifically, the control circuit 34 determines whether the second voltage value V2 is smaller than 0 (negative) (step S44). When it is determined that the second voltage value V2 is smaller than 0 (step S44; Yes), the control circuit 34 determines the optimum voltage value Vc2o of the bias voltage Vc2 by using the equation (3) (step S45). In step S45, the control circuit 34 determines the optimum voltage value Vc2o by adding the half-wavelength voltage Vpi to the second voltage value V2. On the other hand, when it is determined in step S44 that the second voltage value V2 is 0 or more (zero or positive) (step S44; No), the control circuit 34 determines the optimum voltage value Vc2o by using the equation (4) (step S46). In step S46, the control circuit 34 subtracts the half-wavelength voltage Vpi from the second voltage value V2 to determine the optimum voltage value Vc2o.

$$Vc2o = V2 + Vpi \quad (3)$$

$$Vc2o = V2 - Vpi \quad (4)$$

Subsequently, the control circuit 34 determines an optimum voltage value Vpo of the bias voltage Vp based on the third voltage value V3. Specifically, the control circuit 34 determines the optimum voltage value Vpo by adding or subtracting a half value of the half wavelength voltage Vpi to or from the third voltage value V3. In accordance with the value of the third voltage value V3, the control circuit 34 selects whether to perform addition or subtraction of the half value of the half wavelength voltage Vpi.

More specifically, in step S47, the control circuit 34 determines whether the third voltage value V3 is smaller than Vpi. When it is determined that the third voltage value V3 is smaller than Vpi (step S47; Yes), the control circuit 34 determines the optimum voltage value Vpo of the bias voltage Vp by using the equation (5) (step S48). In step S48, the control circuit 34 determines the voltage value Vpo by adding the half value Vpi/2 of the half-wavelength voltage Vpi to the third voltage value V3. On the other hand, when it is determined in step S47 that the third voltage value V3 is equal to or greater than Vpi (step S47; No), the control circuit 34 determines the optimum voltage value Vpo by using the equation (6) (step S49). In step S49, the control circuit 34 determines the optimum voltage value Vpo by subtracting the half value Vpi/2 of the half-wavelength voltage Vpi from the third voltage value V3.

$$Vpo = V3 + Vpi/2 \quad (5)$$

$$Vpo = V3 - Vpi/2 \quad (6)$$

In step S05, the control circuit 34 sets the bias voltage Vc1 to the optimum voltage value Vc1o, sets the bias voltage Vc2 to the optimum voltage value Vc2o, and sets the bias voltage Vp to the optimum voltage value Vpo. Specifically, the control circuit 34 outputs the digital values corresponding to the optimum voltage values Vc1o, Vc2o and Vpo to the DAC 35. As a result, the bias voltage Vc1 of the optimum voltage value Vc1o is supplied to the inner modulator 11, the bias voltage Vc2 of the optimum voltage value Vc2o is supplied to the inner modulator 12, and the bias voltage Vp of the optimum voltage value Vpo is supplied to the outer modulator 15. As a result, the respective bias voltages Vc1, Vc2 and Vp are adjusted to optimum voltage values. Then, the control circuit 34 ends the bias voltage adjustment processing.

The bias voltage adjustment processing described above is performed by the control circuit 34, whereby the bias supplying unit 30 changes the voltage value of the bias voltage Vc1 from (−2×Vpi) to (2×Vpi) while maintaining the voltage value of the bias voltage Vc2 at the voltage value Vc2(0) and maintaining the bias voltage Vp at the voltage value Vp(0), thereby obtaining the first voltage value V1 at which the average power of the monitor light is maximized. The bias supplying unit 30 changes the voltage value of the bias voltage Vc2 from (−2×Vpi) to (2×Vpi) while maintaining the voltage value of the bias voltage Vc1 at the first voltage value V1 and maintaining the bias voltage Vp at the voltage value Vp(0), thereby obtaining the second voltage value V2 at which the average power of the monitor light is maximized. The bias supplying unit 30 changes the voltage value of the bias voltage Vp from 0 to 2×Vpi while maintaining the voltage value of the bias voltage Vc1 at the first voltage value V1 and maintaining the voltage value of the bias voltage Vc2 at the second voltage value V2, thereby obtaining the third voltage value V3 at which the average power of the monitor light is maximized.

Then, the bias supplying unit 30 determines the optimum voltage value Vc1o based on the first voltage value V1, determines the optimum voltage value Vc2o based on the second voltage value V2, and determines the optimum voltage value Vpo based on the third voltage value V3. Each of the bias voltages supplied to the optical modulator 20 is also adjusted to an optimum voltage value by performing a similar bias voltage adjustment processing. Since each of average powers of the optical output signals L4 and L5 is substantially proportional to the average power of the monitor light corresponding to each optical output signal, when the average power of the monitor light is maximum, the average power of the optical output signal L4 is also maximum, and when the average power of the monitor light is minimum, the average power of the optical output signal L4 is also minimum. Each of the first voltage value V1, the second voltage value V2, and the third voltage value V3 is a voltage value at which the average power of the optical output signal L4 is maximized when the corresponding bias voltage is changed within the above-described range.

In the optical transmitter 1 of the present embodiment, the first voltage value V1 at which the average power of the monitor light is maximized is obtained by changing the bias voltage Vc1, the second voltage value V2 at which the average power of the monitor light is maximized is obtained by changing the bias voltage Vc2, and the third voltage value V3 at which the average power of the monitor light is maximized is obtained by changing the bias voltage Vp. It has been found from the calculation results that the optimum voltage value of the bias voltage Vc1 is a value obtained by adding or subtracting the half-wavelength voltage Vpi to or from the first voltage value V1 regardless of the voltage value of the bias voltage Vp, and that the optimum voltage value of the bias voltage Vc2 is a value obtained by adding or subtracting the half-wavelength voltage Vpi to or from the second voltage value V2 regardless of the voltage value of the bias voltage Vp. Further, it has been found from the calculation result that the optimum voltage value of the bias voltage Vp at which the phase difference between the modulated optical signal L41 and the modulated optical signal L42 is 90° is a value obtained by adding or subtracting the half value Vpi/2 of the half-wavelength voltage Vpi to or from the third voltage value V3, regardless of the voltage values of the bias voltage Vc1 and the bias voltage Vc2.

In the bias voltage adjustment processing, the optimum voltage value Vc1o is determined by adding or subtracting the half-wavelength voltage Vpi to or from the first voltage value V1, the optimum voltage value Vc2o is determined by adding or subtracting the half-wavelength voltage Vpi to or from the second voltage value V2, and the optimum voltage value Vpo is determined by adding or subtracting the value Vpi/2 to or from the third voltage value V3. Therefore, the optimum voltage value Vc1o becomes optimum for the bias voltage Vc1, the optimum voltage value Vc2o becomes optimum for the bias voltage Vc2, and the optimum voltage value Vpo becomes optimum for the bias voltage Vp. As a result, even if the voltage values of the bias voltage Vc1 and the bias voltage Vc2 at which the average power of the monitor light is minimized change in accordance with the voltage value of the bias voltage Vp, the bias voltages Vc1, Vc2 and Vp can be appropriately adjusted.

Without using the bias voltage adjustment processing described above, for example, there is a method in which all monitor values are acquired in all combinations of the voltage values of the bias voltages Vc1, Vc2 and Vp at the time of booting up the optical transmitter 1, and optimum voltage values for the bias voltages Vc1, Vc2 and Vp are obtained based on the monitor values in all combinations. In this method, for example, assuming the number of times of changing the voltage values of the respective bias voltages Vc1, Vc2 and Vp is 10 (N is 10), it would be necessary to acquire monitor values in a total of about 1300 combinations of voltage values. Even if the acquisition of the monitor value is carried out in less than 10 milliseconds in a single voltage value combination, this processing would take approximately 13 seconds to optimize the bias voltages Vc1, Vc2, Vp of the optical transmitter 1. Since there is a restriction on the booting-up duration (ready time) allowed for the optical transmitter 1, it would be necessary to employ a control IC having a high processing speed when employing this method.

On the other hand, the optical transmitter 1 of the above embodiment acquires the monitor values under limited combinations of the bias voltages. That is, the monitor value is acquired with the one bias voltage among the bias voltages Vc1, Vc2 and Vp being swept in the predetermined range and with the remaining bias voltages kept constant, and the optimum voltage value at which the average power becomes maximum is acquired. This processing is performed for each of the bias voltages Vc1, Vc2 and Vp, so that each of the bias voltages Vc1, Vc2 and Vp is adjusted to an optimum voltage. Therefore, for example, even if the number of times of sweeping the bias voltages Vc1, Vc2 and Vp is 10, the monitor values can be acquired by a total of 33 combinations of voltage values, and the adjustments of the bias voltages Vc1, Vc2 and Vp are completed in about 0.33 seconds. As a result, it is possible to shorten the time required to adjust the bias voltages Vc1, Vc2 and Vp to the optimum voltage values.

Alternatively, the optimum voltage values of the bias voltages Vc1, Vc2 and Vp may be obtained by temporarily changing the largest amplitudes of the driving signals Vd1, Vd2 at the time of booting up the optical transmitter 1, without using the above-described bias voltage adjustment processing. Specifically, in this method, the maximum amplitudes of the driving signals Vd1, Vd2 are made larger than the half-wavelength voltage Vpi when the optical transmitter 1 is boot up, and the voltage values of the bias voltages Vc1, Vc2 at which the monitor value becomes the maximum are obtained. This eliminates the influence of the voltage value of the bias voltage Vp. Then, while the bias voltages Vc1, Vc2 are maintained at the obtained voltage values, the maximum amplitudes of the driving signals Vd1, Vd2 are made smaller than the half-wavelength voltage Vpi, and the voltage value of the bias voltage Vp at which the monitor value is minimum is obtained. However, in this method, when the optical transmitter 1 is used to transmit the polarization multiplexed optical signal L6 to the outside, if the maximum amplitudes of the driving signals Vd1, Vd2 are equal to or less than the half-wavelength voltage Vpi, the method will require a driving unit capable of generating the driving signal Vd1,Vd2 having the maximum amplitude larger than the half-wavelength voltage Vpi. Therefore, the maximum power consumption in the optical transmitter 1 will increase, and the size of a control circuit in such a driving unit will increase. On the other hand, the optical transmitter 1 according to the above embodiment can adjust the bias voltages Vc1,Vc2 and Vp to optimum voltage values without changing the maximum amplitudes of the driving signals Vd1, Vd2.

The bias supplying unit 30 obtains the first voltage value V1 by sweeping the bias voltage Vc1 within a range from (−2×Vpi) to (2×Vpi) having a range of four times the half-wavelength voltage Vpi, obtains the second voltage value V2 by sweeping the bias voltage Vc2 within a range from (−2×Vpi) to (2×Vpi), and obtains the third voltage value V3 by sweeping the bias voltage Vp within a range from 0 to (2×Vpi) having a range of twice the half-wavelength voltage Vpi.

The change in the average power of the monitor light with respect to the change in the voltage value of each of the bias voltage Vc1 and the bias voltage Vc2 has a periodicity at a period of at most four times the half-wavelength voltage Vpi. The change in the average power of the monitor light with respect to the change in the voltage value of the bias voltage Vp has a periodicity at a period of at most twice the half-wavelength voltage Vpi. Therefore, when the bias voltage Vc1 and the bias voltage Vc2 are swept within a range from (−2×Vpi) to (2×Vpi) which is four times the half-wavelength voltage Vpi, the first voltage value V1 and the second voltage value V2 in which the average power of the monitor light is maximized are included in the range. If the bias voltage Vp is swept within a range from 0 to 2×Vpi, which is twice the half-wavelength voltage Vpi, the third voltage value V3 in which the average power of the monitor light becomes maximum is included in the range. By limiting the range to be swept to a fixed range in this manner, it is possible to shorten the time required for obtaining the first voltage value V1, the second voltage value V2, and the third voltage value V3.

The bias supplying unit 30 determines the optimum voltage value Vc1o by adding the half-wavelength voltage Vpi to the first voltage value V1 when the first voltage value V1 is smaller than 0, which is the center value of the range from (−2×Vpi) to (2×Vpi), and determines the optimum voltage value Vc1o by subtracting the half-wavelength voltage Vpi from the first voltage value V1 when the first voltage value V1 is equal to or larger than 0. In this case, the optimum voltage value Vc1o is included in the range from −Vpi to Vpi. As a result, since the absolute value of the optimum voltage value Vc1o can be reduced, the bias voltage Vc1 can be easily generated.

The bias supplying unit 30 determines the optimum voltage value Vc2o by adding the half-wavelength voltage Vpi to the second voltage value V2 when the second voltage value V2 is smaller than 0, which is the center value of the range from (−2×Vpi) to (2×Vpi), and determines the optimum voltage value Vc2o by subtracting the half-wavelength voltage Vpi from the second voltage value V2 when the second voltage value V2 is equal to or larger than 0. As a result, the optimum voltage value Vc2o is included in the range from −Vpi to Vpi. As a result, since the absolute value of the optimum voltage value Vc2o can be reduced, the biasing voltage Vc2 can be easily generated.

The bias supplying unit 30 determines the optimum voltage value Vpo by adding the half value Vpi/2 of the half wavelength voltage Vpi to the third voltage value V3 when the third voltage value V3 is smaller than the half wavelength voltage Vpi which is the center value of the range from 0 to 2×Vpi, and determines the optimum voltage value Vpo by subtracting the half value Vpi/2 of the half wavelength voltage Vpi from the third voltage value V3 when the third voltage value V3 is equal to or larger than the half wavelength voltage Vpi. As a result, the optimum voltage value Vpo falls within the range from Vpi/2 to 3×Vpi/2. As a result, the absolute value of the optimum voltage value Vpo can be made smaller than that in the case where the voltage value is included in the range from 0 to 2×Vpi, so that the bias voltage Vp can be easily generated.

The detection units 17 and 27 allow the bias supplying unit 30 to detect the power of the optical output signals L4 and L5 by detecting the power of the monitor lights which are a part of the respective optical output signals L4 and L5. Since the monitor light is a part of the optical output signal L4 or L5, the power of the optical output signal L4 or L5 is substantially proportional to the power of the respective monitor light. That is, by detecting the power of the monitor lights, the power of the optical output signals L4 and L5 can be detected. Therefore, in the above configuration, the power of the optical output signals L4 and L5 can be easily detected.

Note that the optical transmitter and the control method of the optical transmitter according to the present disclosure are not limited to the above embodiment.

In the above embodiment, the control circuit 34 acquires the first voltage value V1, the second voltage value V2, and the third voltage value V3 in this order, but may acquire them in any order. In the optimum value determination, in the above-described examples, the optimum voltage value Vc1o and the optimum voltage value Vc2o are determined for each of the first voltage value V1 and the second voltage value V2 in accordance with the determination result of the determination condition as to whether it is "a negative number" or "0 or a positive number". Instead of this determination condition, a determination condition of "a negative number or 0" or "a positive number" may be used for each of the first voltage value V1 and the second voltage value V2, and the optimum voltage value Vc1o and the optimum voltage value Vc2o may be determined in accordance with the determination result. Depending on whether 0 is included in the case of a negative number or the case of a positive number, the value of the optimum voltage value Vc1o (optimum voltage value Vc2o) is determined to be −Vpi or +Vpi when, for example, the first voltage value V1 (second voltage value V2) is 0. For example, if the phase of the optical signal is shifted by −180° when the value of the optimum voltage value Vc1o is set to −Vpi, the phase of the optical signal is shifted by +180° when the value of the optimum voltage value Vc1o is set to +Vpi. Concerning a state of the phase, the optical signal with −180° shifted and the optical signal with +180° are equivalent, and it is possible to set the bias voltage Vc1 to the optimum value in any case.

In order to acquire the first voltage value V1 and the second voltage value V2, the control circuit 34 sweeps the bias voltages Vc1, Vc2 in a range from (−2×Vpi) to (2×Vpi), but the range of the sweeping is not limited to this. The sweeping range of the voltage value of the bias voltage Vc1 is to be at least four times the half-wavelength voltage Vpi, and the sweeping range of the voltage value of the bias voltage Vc2 is to be at least four times the half-wavelength voltage Vpi. For example, the control circuit 34 may sweep the bias voltages Vc1, Vc2 from 0 to 4×Vpi. The ranges in which the biasing voltages Vc1, Vc2 are swept may be different from each other. For example, the control circuit 34 may sweep one of the bias voltages Vc1, Vc2 from (−2×Vpi) to (2×Vpi), and may sweep the other of the bias voltages Vc1, Vc2 from 0 to (4×Vpi). The range of sweeping in the voltage value of the bias voltages Vc1, Vc2 may be larger than four times the half-wavelength voltage Vpi.

In order to acquire the third voltage value V3, the control circuit 34 sweeps the bias voltage Vp in a range from 0 to 2×Vpi, but the range of the sweeping is not limited to this. The sweeping range of the voltage value of the bias voltage Vp is to be at least twice the half-wavelength voltage Vpi. For example, the control circuit 34 may sweep the bias voltage Vp from −Vpi to Vpi. The sweeping range of the voltage value of the bias voltage Vp may be larger than twice the half-wavelength voltage Vpi.

The control circuit 34 may calculate the optimum voltage value Vc1$o$ by adding the half-wavelength voltage Vpi so that the optimum voltage value Vc1$o$ falls within the range from (−2×Vpi) to (2×Vpi). The control circuit 34 may calculate the optimum voltage value Vc1$o$ by subtracting the half-wavelength voltage Vpi so that the voltage value Vc1$o$ falls within the range from (−2×Vpi) to (2×Vpi). For example, the control circuit 34 may add the half-wavelength voltage Vpi to the first voltage value V1 when the first voltage value V1 is included in the range from −2Vpi to −Vpi, and may subtract the half-wavelength voltage Vpi from the first voltage value V1 when the first voltage value V1 is included in the range from Vpi to 2Vpi. At this time, when the first voltage value V1 is included in a range larger than −Vpi and smaller than Vpi, the control circuit 34 may perform either addition or subtraction of the half-wavelength voltage Vpi with respect to the first voltage value V1. Similarly, the control circuit 34 may calculate the optimum voltage value Vc2$o$ such that the optimum voltage value Vc2$o$ falls within the scope from (−2×Vpi) to (2×Vpi) by either adding or subtracting the half-wavelength voltage Vpi. The control circuit 34 may calculate the optimum voltage value Vc3$o$ such that the optimum voltage value Vc3$o$ falls within the range from 0 to 2×Vpi by either adding or subtracting the half value of the half-wavelength voltage Vpi.

Regardless of the value of the first voltage value V1, the control circuit 34 may calculate the optimum voltage value Vc1$o$ by adding the half-wavelength voltage Vpi to the first voltage value V1, or may calculate the optimum voltage value Vc1$o$ by subtracting the half-wavelength voltage Vpi from the first voltage value V1. Since the relationship of the voltage value of the bias voltage Vc1 with the phase difference of the modulated optical signal L41 under the driving signal being at the high level changes periodically at the half-wavelength voltage Vpi, the modulated optical signal L41 having the phase difference of 180° is obtained regardless of whether the half-wavelength voltage Vpi is added or subtracted. Similarly, the control circuit 34 may calculate the optimum voltage value Vc2$o$ by adding the half-wavelength voltage Vpi to the second voltage value V2 regardless of the value of the second voltage value V2, or may calculate the optimum voltage value Vc2$o$ by subtracting the half-wavelength voltage Vpi from the second voltage value V2.

Regardless of the value of the third voltage value V3, the control circuit 34 may calculate the optimum voltage value Vc3$o$ by adding the value Vpi/2 to the third voltage value V3, or may calculate the optimum voltage value Vc3$o$ by subtracting the value Vpi/2 from the third voltage value V3. By adding the half value Vpi/2 of the half-wavelength voltage Vpi to the bias voltage Vp, the phase of either one of the modulated optical signal L41 and the modulated optical signal L42 advances by 90° with respect to the other phase, and by subtracting the bias voltage Vp, the phase of either one of the modulated optical signal L41 and the modulated optical signal L42 lags by 90° with respect to the other phase. The modulated optical signal L41 has two phase states when the phase difference is 0 and 180°. The modulated optical signal L42 has two phase states when the phase difference is 0° and 180°. Thus, in both cases, QPSK modulated optical output signals L4 having four phase states assigned at 90° intervals are obtained.

The control circuit 34 performs the bias voltage adjustment processing at the time of booting up the optical transmitter 1, but may perform the bias voltage adjustment processing at the time of manufacturing the optical transmitter 1, or may perform the bias voltage adjustment processing as an automatic adjustment of the voltage values of the bias voltages Vc1, Vc2 and Vp in the use condition while the optical transmitter 1 continues to output the polarization multiplexed optical signal L6 to the outside. Note that the bias voltage adjustment processing is performed when the optical transmitter 1 is activated, and the voltage values of the bias voltages Vc1, Vc2 may be automatically adjusted so that the average power of the monitor light is minimized while the voltage value of the bias voltage Vp is maintained in the use condition of the optical transmitter 1.

In the above embodiment, the power of the monitor light is directly detected, and the power of the optical output signal L4 is detected based on the relationship between the power of the monitor light and the power of the optical output signal L4. The method of detecting the power of the optical output signal L4 is not limited to this. For example, under a condition in which the optical output signal L5 is not output from the optical modulator 20 (or a state in which the power can be regarded as substantially zero), the power of the polarization multiplexed optical signal L6 may be detected by using a power meter or the like outside the optical transmitter 1. At this time, since the polarization multiplexed optical signal L6 does not include the optical output signal L5, the power of the polarization multiplexed optical signal L6 can be treated as being substantially equal to the power of the optical output signal L4. In this manner, the power of the optical output signal L4 may be detected by detecting the power of the polarization multiplexed optical signal L6 in a state in which the optical output signal L5 is not output. The power of the optical output signal L4 thus obtained may be used to adjust each bias by the method described above. For example, by stopping the supply of the driving signal to the optical modulator 20 and setting the bias voltages of the modulators 21, 22, and 25 to the half-wavelength voltage, the optical output signal L5 can be substantially not output.

What is claimed is:

1. An optical transmitter comprising:
   an optical modulator including a first inner modulator, a second inner modulator, and an outer modulator, the first inner modulator generating a first modulated optical signal by phase-modulating a first split light in response to a first driving signal, the second inner modulator generating a second modulated optical signal by phase-modulating a second split light in response to a second driving signal, the outer modulator generating an optical output signal from the first modulated optical signal and the second modulated optical signal, and the first and second split light being split from an input light;
   a bias supplying circuit configured to supply a first bias voltage to the first inner modulator, a second bias voltage to the second inner modulator, and a third bias voltage to the outer modulator, the first bias voltage being a reference voltage for the first driving signal, and the second bias voltage being a reference voltage for the second driving signal; and
   a detector configured to detect power in the optical output signal, wherein each of the first and second driving signals has a respective maximum amplitude equal to or smaller than a half-wavelength voltage, the half-wavelength voltage being a voltage for phase changing light by 180°, the bias supplying circuit acquires a first voltage value at which an average value of the optical output signal becomes maximum, the first voltage value is acquired by sweeping the first bias voltage under a driving condition at which the first driving signal is supplied to the first inner modulator and the second driving signal is supplied to the second inner modulator, the bias supplying circuit acquires a second voltage value at which an average value of the optical output signal becomes maximum by sweeping the second bias voltage under the driving condition, the bias supplying circuit acquires a third voltage value at which an average value of the optical output signal becomes maximum by sweeping the third bias voltage under the driving condition, the bias supplying circuit determines an optimum value of the first bias voltage by adding or subtracting the half-wavelength voltage to or from the first voltage value, the bias supplying circuit determines an optimum value of the second bias voltage by adding or subtracting the half-wavelength voltage to or from the second voltage value, and the bias supplying circuit determines an optimum value of the third bias voltage by adding or subtracting a half of the half-wavelength voltage to or from the third voltage value.

2. The optical transmitter of claim 1, wherein the bias supplying circuit acquires the first voltage value by sweeping the first bias voltage within a first range having a range of four times the half-wavelength voltage, the bias supplying circuit acquires the second voltage value by sweeping the second bias voltage within a second range having a range of four times the half-wavelength voltage, and the bias supplying circuit acquires the third voltage value by sweeping the third bias voltage within a third range having a range of twice the half-wavelength voltage.

3. The optical transmitter of claim 2, wherein the bias supplying circuit determines the optimum value of the first bias voltage by adding the half-wavelength voltage to the first voltage value when the first voltage value is smaller than a central value of the first range, and the bias supplying circuit determines the optimum value of the first bias voltage by subtracting the half-wavelength voltage from the first voltage value when the first voltage value is larger than the central value of the first range.

4. The optical transmitter of claim 2, wherein the bias supplying circuit determines the optimum value of the second bias voltage by adding the half-wavelength voltage to the second voltage value when the second voltage value is smaller than a central value of the second range, and the bias supplying circuit determines the optimum value of the second bias voltage by subtracting the half-wavelength voltage from the second voltage value when the second voltage value is larger than the central value of the second range.

5. The optical transmitter of claim 2, wherein the bias supplying circuit determines the optimum value of the third bias voltage by adding a half of the half-wavelength voltage to the third voltage value when the third voltage value is smaller than a central value of the third range, and the bias supplying circuit determines the optimum value of the third bias voltage by subtracting a half of the half-wavelength voltage from the third voltage value when the third voltage value is larger than the central value of the third range.

6. The optical transmitter of claim 1, wherein the detector detects the power in the optical output signal by detecting power in a monitor light that is part of the optical output signal.

7. A method of controlling an optical transmitter that comprises: a first inner modulator, a second inner modulator, and an outer modulator, the first inner modulator generating a first modulated optical signal by phase-modulating a first split light in response to a first driving signal, the second inner modulator generating a second modulated optical signal by phase-modulating a second split light in response to a second driving signal, the outer modulator generating an optical output signal from the first modulated optical signal and the second modulated optical signal, and the first and second split light being split from an input light, the method comprising steps of:

acquiring a first voltage value at which an average value of the optical output signal becomes maximum, the first voltage value being acquired by sweeping a first bias voltage supplied to the first inner modulator under a driving condition at which the first driving signal is supplied to the first inner modulator and the second driving signal is supplied to the second inner modulator;

acquiring a second voltage value at which an average value of the optical output signal becomes maximum by sweeping a second bias voltage supplied to the second inner modulator under the driving condition;

acquiring a third voltage value at which an average value of the optical output signal becomes maximum by sweeping a third bias voltage supplied to the outer modulator under the driving condition, determining an optimum value of the first bias voltage by adding or subtracting a half-wavelength voltage to or from the first voltage value, determining an optimum value of the second bias voltage by adding or subtracting the half-wavelength voltage to or from the second voltage value, and determining an optimum value of the third bias voltage by adding or subtracting a half of the half-wavelength voltage to or from the third voltage value, wherein the first driving signal and the second driving signal have a respective maximum amplitude equal to or smaller than the half-wavelength voltage, the half-wavelength voltage being a voltage for phase changing light by 180°.

8. An optical transmitter comprising:

an optical modulator including a first inner modulator, a second inner modulator, and an outer modulator, the first inner modulator generating a first modulated optical signal by phase-modulating a first split light in response to a first driving signal, the second inner modulator generating a second modulated optical signal by phase-modulating a second split light in response to a second driving signal, the outer modulator generating an optical output signal from the first modulated optical signal and the second modulated optical signal, and the first and second split light being split from an input light;

a bias supplying circuit configured to supply a first bias voltage to the first inner modulator, a second bias voltage to the second inner modulator, and a third bias voltage to the outer modulator, the first bias voltage being a reference voltage for the first driving signal, and the second bias voltage being a reference voltage for the second driving signal; and a detector configured to detect power in the optical output signal, wherein each of the first and second driving signals has a respective maximum amplitude equal to or smaller than a half-wavelength voltage, the half-wavelength voltage being a voltage for phase changing light by 180°, the bias supplying circuit acquires a first voltage value at which an average value of the optical output signal becomes maximum, the first voltage value is acquired by sweeping the first bias voltage within a first range having a range of four times the half-wavelength voltage under a driving condition at which the first driving signal is supplied to the first inner modulator and the second driving signal is supplied to the second inner modulator, the bias supplying circuit acquires a second voltage value at which an average value of the optical output signal becomes maximum by sweeping the second bias voltage within a second range having a range of four times the half-wavelength voltage under the driving condition, the bias supplying circuit acquires a third voltage value at which an average value of the optical output signal becomes maximum by sweeping the third bias voltage within a third range having a range of twice the half-wavelength voltage under the driving condition, the bias supplying circuit determines an optimum value of the first bias voltage based on the first voltage value, the bias supplying circuit determines an optimum value of the second bias voltage based on the second voltage value, and the bias supplying circuit determines an optimum value of the third bias voltage based on the third voltage value.

9. The optical transmitter of claim 8, wherein the bias supplying circuit determines the optimum value of the first bias voltage by adding the half-wavelength voltage to the first voltage value when the first voltage value is smaller than a central value of the first range, and the bias supplying circuit determines the optimum value of the first bias voltage by subtracting the half-wavelength voltage from the first voltage value when the first voltage value is larger than the central value of the first range.

10. The optical transmitter of claim 8, wherein the bias supplying circuit determines the optimum value of the second bias voltage by adding the half-wavelength voltage to the second voltage value when the second voltage value is smaller than a central value of the second range, and the bias supplying circuit determines the optimum value of the second bias voltage by subtracting the half-wavelength voltage from the second voltage value when the second voltage value is larger than the central value of the second range.

11. The optical transmitter of claim 8, wherein the bias supplying circuit determines the optimum value of the third bias voltage by adding a half of the half-wavelength voltage to the third voltage value when the third voltage value is smaller than a central value of the third range, and the bias supplying circuit determines the optimum value of the third bias voltage by subtracting a half of the half-wavelength voltage from the third voltage value when the third voltage value is larger than the central value of the third range.

12. The optical transmitter of claim 8, wherein the detector detects the power in the optical output signal by detecting power in a monitor light that is part of the optical output signal.

* * * * *